US012725367B2

(12) United States Patent
Ye et al.

(10) Patent No.: US 12,725,367 B2
(45) Date of Patent: Sep. 1, 2026

(54) PICTURE DISPLAY METHOD, SYSTEM, AND APPARATUS, DEVICE, AND STORAGE MEDIUM

(71) Applicant: Tencent Technology (Shenzhen) Company Limited, Shenzhen (CN)

(72) Inventors: Chenghao Ye, Shenzhen (CN); Ziyi Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 72 days.

(21) Appl. No.: 18/739,183

(22) Filed: Jun. 10, 2024

(65) Prior Publication Data

US 2024/0331308 A1 Oct. 3, 2024

Related U.S. Application Data

(63) Continuation of application No. PCT/CN2023/085849, filed on Apr. 3, 2023.

(30) Foreign Application Priority Data

May 26, 2022 (CN) ......................... 202210590480.3

(51) Int. Cl.
*G09G 5/00* (2006.01)
*G06F 3/04815* (2022.01)
(Continued)

(52) U.S. Cl.
CPC ........ *G06T 19/003* (2013.01); *G06F 3/04815* (2013.01); *G06T 7/70* (2017.01); *G06T 19/20* (2013.01); *G06T 2219/024* (2013.01)

(58) Field of Classification Search
CPC ....... G06T 19/00; G06T 19/006; G06T 17/00; G06T 11/00; G06T 19/003; G06T 7/70;
(Continued)

(56) References Cited

U.S. PATENT DOCUMENTS

| | | | | |
|---|---|---|---|---|
| 2019/0353457 | A1* | 11/2019 | Northrup | G01S 5/16 |
| 2020/0298116 | A1* | 9/2020 | Wang | G06T 11/206 |
| 2023/0171561 | A1* | 6/2023 | Zohoorian | H04W 4/026 455/456.5 |

FOREIGN PATENT DOCUMENTS

| | | |
|---|---|---|
| CN | 110124310 A | 8/2019 |
| CN | 110917616 A | 3/2020 |

(Continued)

OTHER PUBLICATIONS

Tencent Technology, WO, PCT/CN2023/085849, Jul. 3, 2023, 5 pgs.

(Continued)

*Primary Examiner* — Gordon G Liu

(74) *Attorney, Agent, or Firm* — Morgan, Lewis & Bockius LLP

(57) ABSTRACT

A picture display method, system is performed by a computer device. The method includes: displaying a virtual environment, the virtual environment including a first virtual object and a second virtual object; in response to that the first virtual object marks a target marked point in the virtual environment, determining orientation prompt information of the target marked point relative to the second virtual object and transmitting the orientation prompt information of the target marked point to the second virtual object; and displaying the target marked point in the virtual environment in response to receiving an operation of changing an orientation of the second virtual object to the target marked point based on the orientation prompt information.

20 Claims, 12 Drawing Sheets

(51) Int. Cl.
*G06T 7/70* (2017.01)
*G06T 19/00* (2011.01)
*G06T 19/20* (2011.01)

(58) Field of Classification Search
CPC ... G06T 19/20; G06T 2219/024; H04N 5/272; A63F 13/10; G01S 11/12; G01S 11/14; G02B 25/001; G06V 40/18; G06F 3/04815; G06F 3/0481
USPC .......................................................... 345/632
See application file for complete search history.

(56) References Cited

FOREIGN PATENT DOCUMENTS

| | | | |
|---|---|---|---|
| CN | 111672125 | A | 9/2020 |
| CN | 113082707 | A | 7/2021 |
| CN | 113209616 | A | 8/2021 |
| CN | 113244603 | A | 8/2021 |
| JP | 2018142319 | A | 9/2018 |

OTHER PUBLICATIONS

Tencent Technology, IPRP, PCT/CN2023/085849, Nov. 7, 2024, 6 pgs.

GameFavo.com, "Overwatch 2 Ping System", Overwatch 2: New Feature Ping System Introduced on Official Website! Enemy Pings Follow, Mar. 2022, Retrieved from the Internet: https://gamefavo.com/news/overwatch/ow2-ping-system-reveal/.

Pontako.com, "Quick Marker Automation", [PUBG] Set it to Automatically Shoot a "Quick Marker" When You Fire a Gun, PONTAKOBLOG—A blog that writes about strategies for smartphone and PC games, Jan. 2022, Retrieved from the Internet: https://pontako.com/pubg-cuick-marker/.

Tencent Technology, ISR, PCT/CN2023/085849, Jul. 3, 2023, 3 pgs.

Pubg.52pk.com, PUBG_STEAM, "Version Review: Introduction to UI/Marking/Supplies and Other Related Aspects in the 30th Update", Jun. 2021, Retrieved from the Internet: https://pubg.52pk.com/xinwen/7322478.shtml.

* cited by examiner

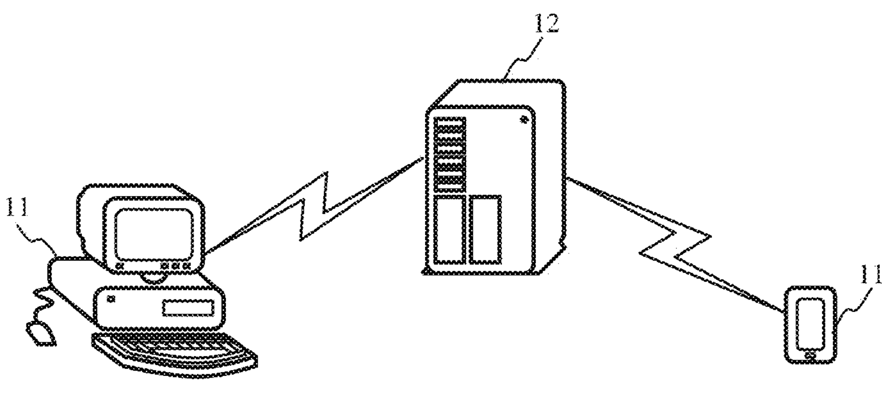

FIG. 1

Server

Second client

201: The server obtains, in response to that a first virtual object marks a target marked point in a virtual environment, a location of the target marked point and a location of a second virtual object, the first virtual object being different from the second virtual object 202: The server determines, based on the location of the target marked point and the location of the second virtual object, a target orientation in which the target marked point is located relative to the second virtual object 204: The second client displays the virtual environment 203: The server generates orientation prompt information of the target marked point based on the target orientation, and transmits the orientation prompt information to the second client 205: The second client represents the orientation prompt information of the target marked point after the first virtual object marks the target marked point in the virtual environment, the orientation prompt information including a target orientation in which the target marked point is located relative to the second virtual object 206: The second client displays the target marked point in the virtual environment in response to receiving an operation of changing an orientation of the second virtual object to the target orientation

FIG. 2

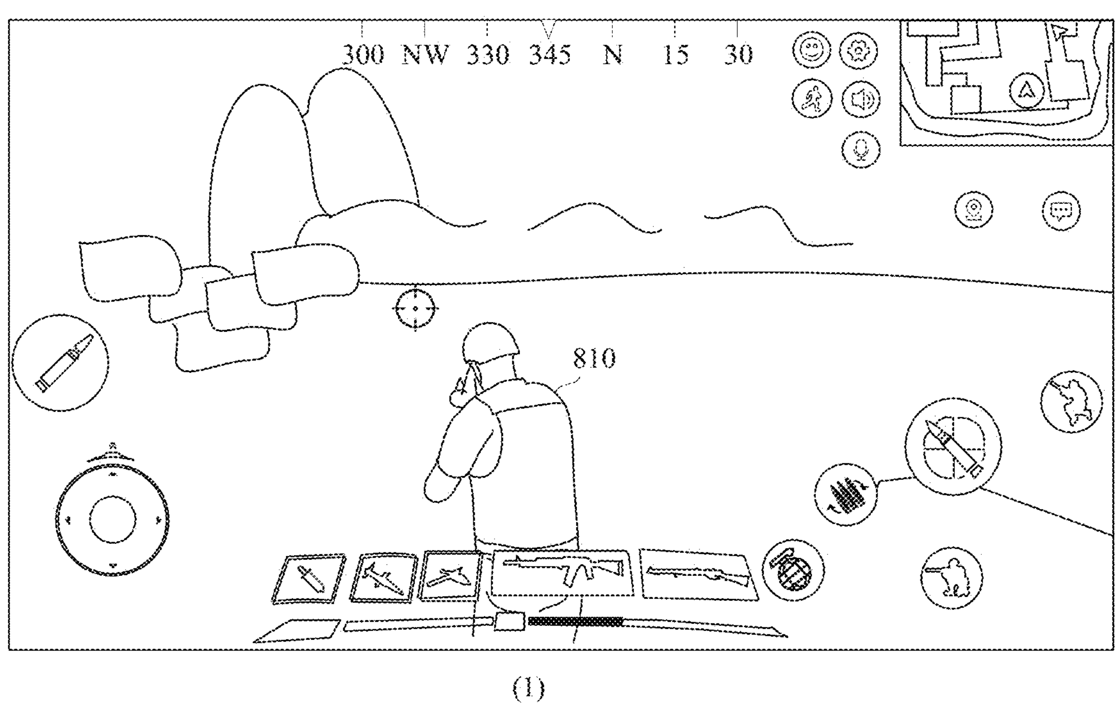
(1)
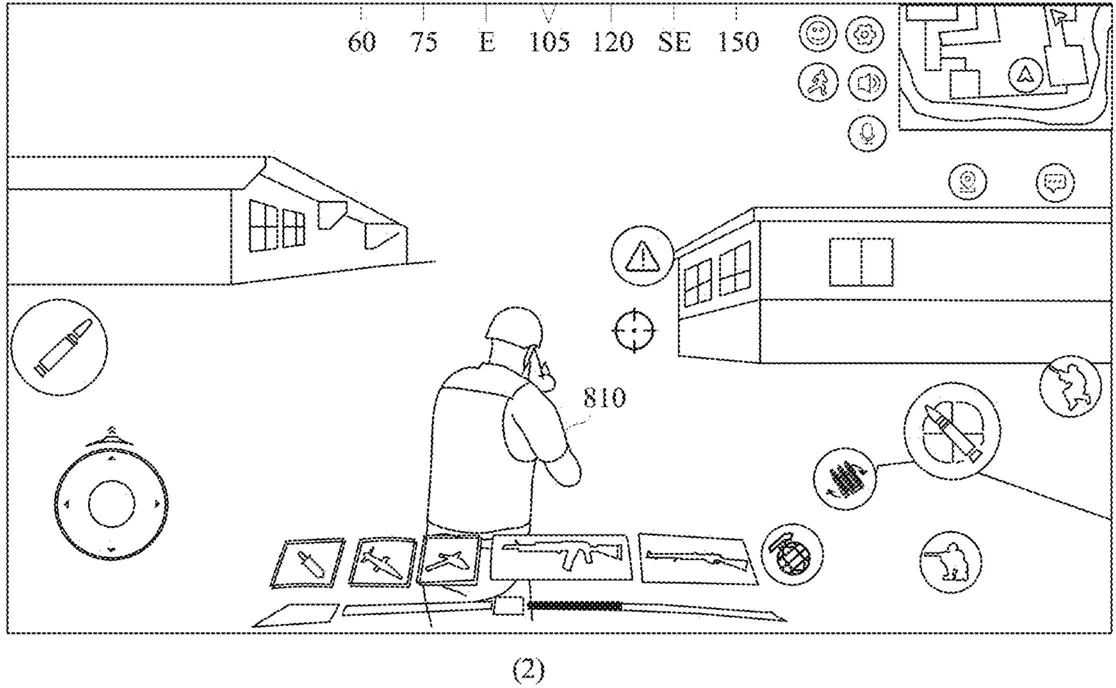
(2)
FIG. 8

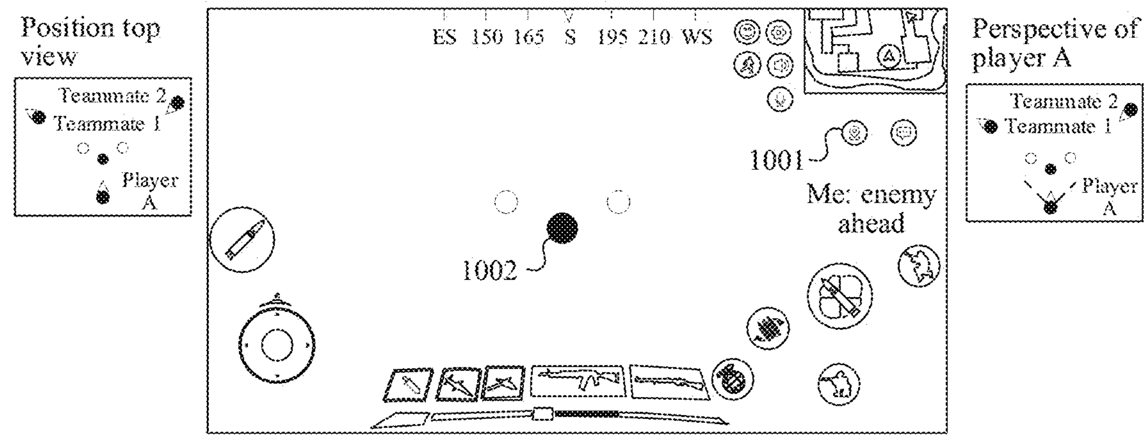
FIG. 10
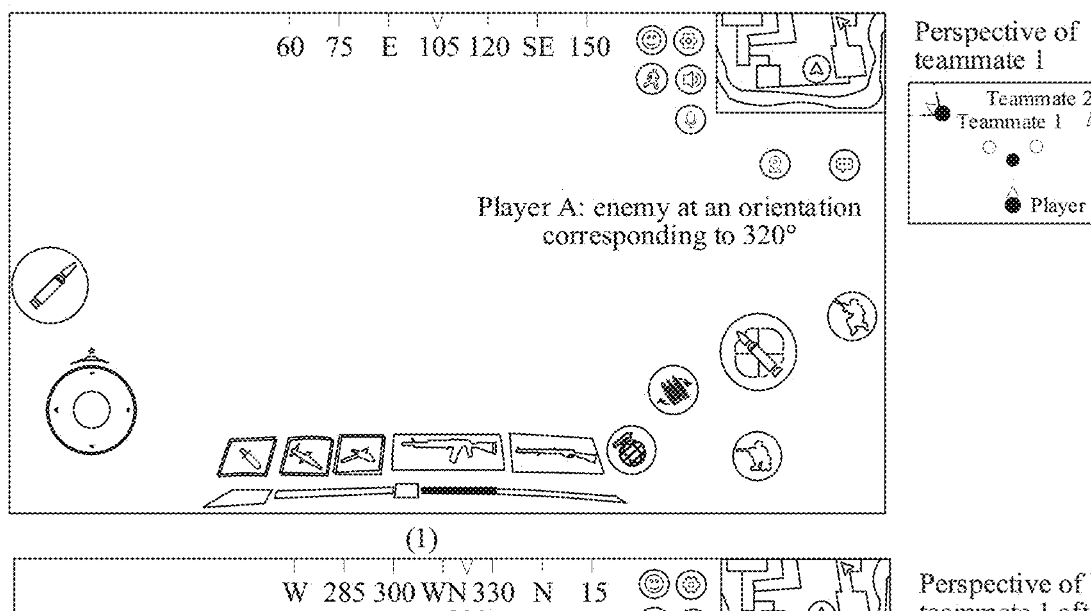
(1)
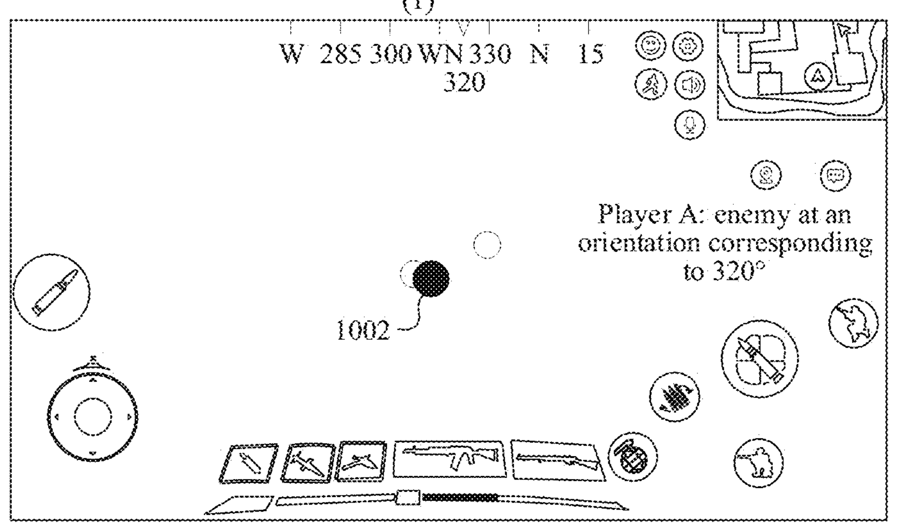
Perspective of teammate 1 after an orientation is changed
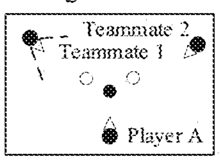
(2)
FIG. 11

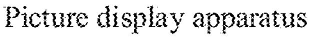
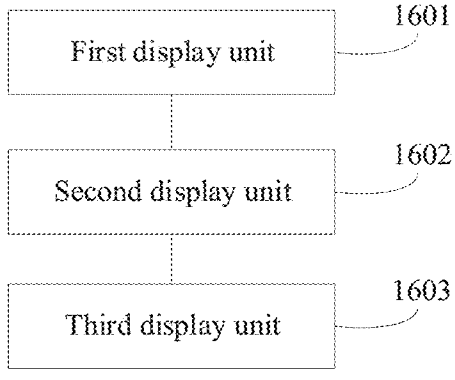
FIG. 16
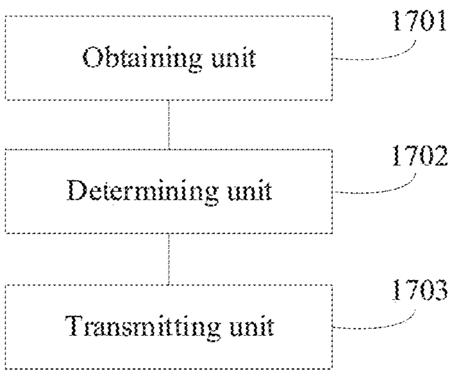
FIG. 17
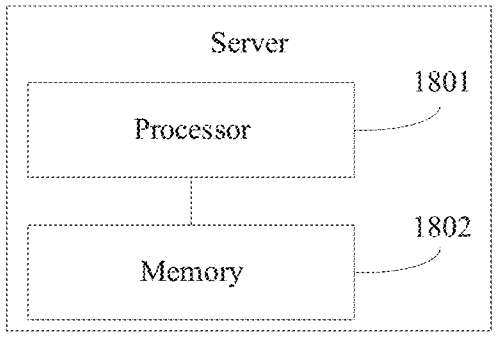
FIG. 18

PICTURE DISPLAY METHOD, SYSTEM, AND APPARATUS, DEVICE, AND STORAGE MEDIUM

CROSS-REFERENCE TO RELATED APPLICATIONS

This application is a continuation application of PCT Patent Application No. PCT/CN2023/085849, entitled "PICTURE DISPLAY METHOD, SYSTEM, AND APPARATUS, DEVICE, AND STORAGE MEDIUM" filed on Apr. 3, 2023, which claims priority to Chinese Patent Application No. 202210590480.6, entitled "PICTURE DISPLAY METHOD, SYSTEM, AND APPARATUS, DEVICE, AND STORAGE MEDIUM" filed on May 26, 2022, both of which are incorporated herein by reference in their entirety.

FIELD OF THE TECHNOLOGY

Embodiments of this application relate to the field of computer technologies, and in particular, to a picture display method, system, and apparatus, a device, and a storage medium.

BACKGROUND OF THE DISCLOSURE

In some virtual scene-based applications, a user can control a virtual object to act in a virtual scene via a client.

In related art, the virtual object can mark a marked point in the virtual scene, so that another virtual object can observe the marked point in the virtual scene, and interactive objects can interact in a virtual environment by using the marked point. For example, the interactive objects can find the marked point in the virtual scene and display a virtual environment picture including the marked point.

However, because the marked point itself is displayed as an auxiliary sign, perception is usually low, so that a player cannot quickly and accurately find a location of the marked point in the virtual scene. As a result, a marker of the marked point cannot promote an interaction between virtual objects. Not only is human-machine efficiency low, but computing resources of a server and display resources of a terminal are wasted.

SUMMARY

Embodiments of this application provide a picture display method, system, and apparatus, a device, and a storage medium. This can improve human-machine interaction efficiency. Technical solutions are as follows.

According to an aspect, an embodiment of this application provides a picture display method, performed by a computer device. The method includes:

- displaying a virtual environment, the virtual environment including a first virtual object and a second virtual object;
- in response to that the first virtual object marks a target marked point in the virtual environment, determining orientation prompt information of the target marked point relative to the second virtual object and transmitting the orientation prompt information of the target marked point to the second virtual object; and
- displaying the target marked point in the virtual environment in response to receiving an operation of changing an orientation of the second virtual object to the target marked point based on the orientation prompt information.

Another picture display method is further provided. The method includes:

- obtaining, in response to that a first virtual object marks a target marked point in a virtual environment, a location of the target marked point and a location of a second virtual object, the first virtual object being different from the second virtual object;
- determining, based on the location of the target marked point and the location of the second virtual object, a target orientation in which the target marked point is located relative to the second virtual object; and
- generating orientation prompt information of the target marked point based on the target orientation; and transmitting the orientation prompt information to a client controlling the second virtual object, the client being configured for representing the orientation prompt information.

According to another aspect, a computer device is provided. The computer device includes a processor and a memory. The memory has at least one computer program stored therein, and the at least one computer program is loaded and executed by the processor to enable the computer device to implement any one of the foregoing picture display methods.

According to another aspect, a non-transitory computer-readable storage medium is further provided. The computer-readable storage medium has at least one computer program stored thereon, and the at least one computer program is loaded and executed by a processor to enable a computer to implement any one of the foregoing picture display methods.

The technical solutions provided in embodiments of this application at least have the following beneficial effects.

According to the technical solutions in embodiments of this application, the orientation prompt information obtained by the client controlling the second virtual object includes the target orientation in which the target marked point is located relative to the second virtual object. Such orientation prompt information can clearly prompt a relationship between the target marked point and the second virtual object in an orientation, and the orientation prompt information has high effectiveness. Under prompt of such orientation prompt information, interactive objects can enable the client to display the virtual environment picture including the target marked point by using the operation of changing the orientation of the second virtual object to the target orientation. Operation convenience of displaying the virtual environment picture including the target marked point is high, efficiency of displaying the virtual environment picture including the target marked point is improved, and a human-machine interaction rate and interactive experience of the interactive objects are improved.

BRIEF DESCRIPTION OF THE DRAWINGS

FIG. 1 is a schematic diagram of an implementation environment of a picture display method according to an embodiment of this application.

FIG. 2 is a flowchart of a picture display method according to an embodiment of this application.

FIG. 8 is a schematic diagram of a virtual environment picture according to an embodiment of this application.

FIG. 10 is a schematic diagram of a display interface according to an embodiment of this application.

FIG. 11 is a schematic diagram of a display interface according to an embodiment of this application.

FIG. 16 is a schematic diagram of a picture display apparatus according to an embodiment of this application.

FIG. 17 is a schematic diagram of a picture display apparatus according to an embodiment of this application.

FIG. 18 is a schematic diagram of a structure of a server according to an embodiment of this application.

DESCRIPTION OF EMBODIMENTS

Figure 3:
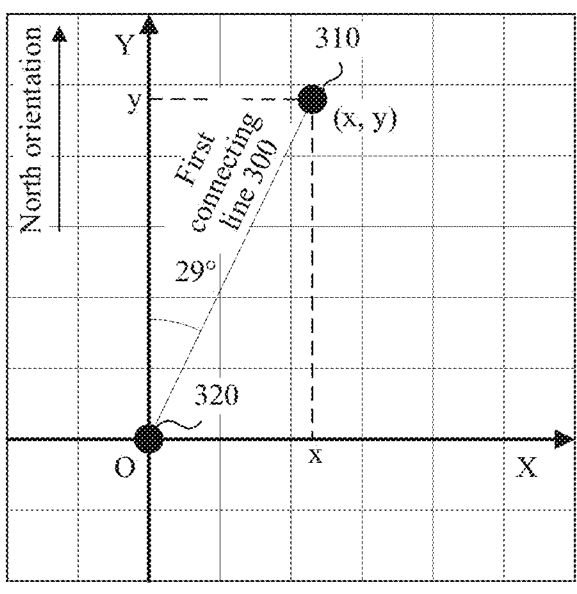
FIG. 3 is a schematic diagram of a process of determining a target included angle between a first connecting line and a first ray according to an embodiment of this application.

The following describes terms in embodiments of this application.

Virtual environment: It is an environment provided (or displayed) by a client when running on a terminal. The virtual environment refers to an environment created for a virtual object to perform activities. The virtual environment may be a two-dimensional virtual environment, a 2.5-dimensional virtual environment, or a three-dimensional virtual environment.

Virtual object: It is a movable object in a virtual environment. The virtual object may be a virtual character, a virtual animal, an animation character, or the like. For example, the virtual object may be a character, an animal, a plant, an oil barrel, a wall, a stone, or the like displayed in the virtual environment. Interactive objects can manipulate the virtual object by using a peripheral component or by tapping a display screen.

FIG. 1 is a schematic diagram of an implementation environment of a picture display method according to an embodiment of this application. The implementation environment includes a terminal 11 and a server 12.

A client that supports a virtual environment is installed and run on the terminal 11. An interactive object can use the client in the terminal 11 to control a virtual object to perform an activity in the virtual environment. The activity includes but is not limited to adjusting a body posture, crawling, walking, running, riding, jumping, driving, picking up, shooting, attacking, throwing, changing a location, and the like.

The client that supports the virtual environment is not limited in this embodiment of this application. For example, the client that supports the virtual environment includes but is not limited to a virtual reality (VR) client, an augmented reality (AR) client, a three-dimensional map client, a game client, a social client, an interactive entertainment client, and the like.

The server 12 is configured to provide a background service for the client that is installed on the terminal 11 and that supports the virtual environment. In a possible implementation, the server 12 undertakes main computing work and the terminal 11 undertakes secondary computing work, or the server 12 undertakes secondary computing work and the terminal 11 undertakes main computing work, or a distributed computing architecture is used between the server 12 and the terminal 11 for collaborative computing.

In a possible implementation, the terminal 11 is any electronic product, such as a personal computer (PC), a mobile phone, a smart phone, a personal digital assistant (PDA), a wearable device, a handheld portable game device, a pocket personal computer (Pocket PC), a tablet computer, a smart in-vehicle infotainment, a smart television, a smart speaker, that may interact with the interactive object by using one or more manners such as a keyboard, a touch pad, a touch screen, a remote controller, a voice interaction, or a handwriting device. The server 12 may be one server, a server cluster including a plurality of servers, or a cloud computing service center. A communication connection is established between the terminal 11 and the server 12 by using a wireless network or a wired network.

Information (which includes but not limited to user device information, user personal information, and the like), data (which includes but not limited to data used for analysis, stored data, displayed data, and the like), and signals involved in this application are all authorized by the user or fully authorized by all parties, and collection, use, and processing of related data need to comply with relevant laws, regulations, and standards of relevant countries and regions. For example, game operation data in this application is obtained under full authorization.

Based on the foregoing implementation environment shown in FIG. 1, an embodiment of this application provides a picture display method. An example in which the method is interactively performed by a second client and the server 12 is used. The second client is a client that is installed on the terminal 11 and that controls a second virtual object. As shown in FIG. 2, the picture display method provided in this embodiment of this application may include operation 201 to operation 206.

Operation 201: The server obtains, in response to that a first virtual object marks a target marked point in a virtual environment, a location of the target marked point and a location of the second virtual object, the first virtual object being different from the second virtual object.

The first virtual object is any virtual object that can perform an activity in the virtual environment. The target marked point is a point marked by the first virtual object in the virtual environment. The target marked point may be configured for marking a specific virtual item, a specific virtual object, a specific location, or the like. A form of the target marked point is not limited in this embodiment of this application. For example, the form of the target marked point may be a marked point with a target shape and a target color. The target shape and the target color are set based on experience or flexibly adjusted based on an application scenario. For example, the target shape is circular and the target color is red.

In an exemplary embodiment, the server determines that the first virtual object marks the target marked point in the virtual environment by the following manner. In response to receiving identification information of the target marked point transmitted by a first client, the server determines that the first virtual object marks the target marked point in the virtual environment. The identification information of the target marked point is configured for identifying the target marked point. For example, the identification information of the target marked point includes but is not limited to a location of the target marked point, a name of the target marked point, and the like. The first client refers to a client controlling the first virtual object.

A process that the first client transmits the identification information of the target marked point to the server includes: The first client obtains a marked point marking operation; in response to the marked point marking operation, marks the target marked point at a target location in the virtual environment by using the first virtual object; and transmits the identification information of the target marked point to the server. Alternatively, the first client obtains a marked point marking operation, and transmits a marked request to the server in response to the marked point marking operation. The server determines the target marked point based on a direction in which the first virtual object faces in a virtual scene and a ray collision detection in the virtual scene.

The marked point marking operation is an operation for marking the target marked point triggered by an interactive object of the first client. In an exemplary embodiment, a manner that the first client obtains the marked point marking operation may be: The first client displays a marked control, and obtains the marked point marking operation in response to a trigger operation of the marked control. The marked control is a button or an icon that can be triggered, and the trigger operation of the marking operation may be an operation of single-tapping or double-tapping the marked control or the like. In an exemplary embodiment, a manner that the first client obtains the marked point marking operation may alternatively be: The first client displays an option entry, displays a plurality of candidate options in response to a trigger operation of the option entry, where the plurality of candidate options include a marked point marking option, and obtains the marked point marking operation in response to a selection operation of the marked point marking option. The foregoing description is only an example description of an implementation that the first client obtains the marked point marking operation. This is not limited in this embodiment of this application.

A moment when the interactive object of the first client triggers the marked point marking operation is not limited in this embodiment of this application. For example, if a marked purpose of the target marked point is to mark a virtual object in an enemy camp, the interactive object of the first client may trigger the marked point marking operation when the first virtual object aims at the virtual object in the enemy camp by using a virtual prop. In this case, the target marked point can indicate that there is danger. For example, if a marked purpose of the target marked point is to mark a virtual building that can be configured for avoiding attacks, the interactive object of the first client may trigger the marked point marking operation when the first virtual object aims at the virtual building by using a virtual prop. For example, if a marked purpose of the target marked point is to mark a first virtual prop that may be picked up in the virtual environment, the interactive object of the first client may aim at the first virtual prop by using a held second virtual prop to trigger the marked point marking operation. In this case, the target marked point can indicate that there is a material that may be picked up.

After obtaining the marked point marking operation, in response to the marked point marking operation, the first client marks a target marked point at a target location in the virtual environment by using the first virtual object. For example, the target location is a location at which the first virtual object is aimed by using the virtual prop when the marked point marking operation is obtained. Marking the target marked point at the target location in the virtual environment by the first virtual object means marking the target marked point at the location aimed by using the virtual prop by the first virtual object. After determining that the target marked point is marked, the first client transmits the identification information of the target marked point to the server.

In an exemplary embodiment, the first client may further display prompt information in a display interface of the first client after determining that the target marked point is marked. The prompt information includes an orientation in which the target marked point is located relative to the first virtual object. For example, an example in which the target marked point can indicate that there is danger is used. The prompt information may be "a nickname of the first virtual object: danger ahead". The ahead refers to an orientation in which the target marked point is located relative to the first virtual object. For example, the display interface of the first client includes a virtual environment picture which is collected by performing picture collection on the virtual environment from a perspective of the first virtual object. Because the target marked point is located in front of the first virtual object, the target marked point can be observed from the perspective of the first virtual object, so that the display interface further displays a virtual environment picture including the target marked point.

After receiving identification information of the target marked point transmitted by the first client, the server determines that the first virtual object marks the target marked point in the virtual environment, then in response to that the first virtual object marks the target marked point in the virtual environment, obtains the location of the target marked point and the location of the second virtual object, and transmits orientation prompt information of the target marked point with high prompt effectiveness to a client (that is, the second client) controlling the second virtual object based on the location of the target marked point and the location of the second virtual object.

The location of the target marked point is a location of the target marked point in the virtual environment. The location of the second virtual object is a location of the second virtual object in the virtual environment in a process of displaying the target marked point.

The second virtual object is a virtual object that has a target association relationship with the first virtual object. The target association relationship is not limited in this embodiment of this application. For example, the virtual object having the target association relationship with the first virtual object is a virtual object in the same camp as the first virtual object, or the virtual object having the target association relationship with the first virtual object is a virtual object in a different camp from the first virtual object. The second virtual object and the first virtual object are virtual objects active in the same virtual environment.

In an exemplary embodiment, an implementation that the server obtains the location of the target marked point includes but is not limited to: The server extracts the location of the target marked point from the identification information of the target marked point, and the server searches the virtual environment for a target marked point that matches the identification information of the target marked point, and uses a location of the searched target marked point in the virtual environment as the location of the target marked point. In an exemplary embodiment, an implementation that the server obtains the location of the second virtual object includes but is not limited to: The server directly extracts the location of the second virtual object from a storage, and the server obtains the location of the second virtual object by communicating with the second client.

Operation 202: The server determines, based on the location of the target marked point and the location of the second virtual object, a target orientation in which the target marked point is located relative to the second virtual object.

The target orientation in which the target marked point is located relative to the second virtual object is an orientation of the location of the target marked point determined by using the location of the second virtual object as a reference.

In a possible implementation, an implementation process of determining, based on the location of the target marked point and the location of the second virtual object, the target orientation in which the target marked point is located relative to the second virtual object includes the following operation A and operation B.

Operation A: Determine a target included angle between a first connecting line and a first ray, the first connecting line being a connecting line between the location of the second virtual object and the location of the target marked point, and the first ray being a ray extending from the location of the second virtual object to a reference orientation.

After obtaining the location of the target marked point and the location of the second virtual object, the server can use the connecting line between the location of the second virtual object and the location of the target marked point as the first connecting line, then determine an included angle between the first connecting line and the first ray, and use the included angle as the target included angle. The first ray is the ray extending from the location of the second virtual object to the reference orientation. In other words, an end point of the first ray is the location of the second virtual object, and an extending direction of the first ray is a direction from the location of the second virtual object to the reference orientation.

The reference orientation is set based on experience or flexibly adjusted based on an application scenario. This is not limited in this embodiment of this application. For example, the reference orientation may be a north orientation, a south orientation, or the like in the virtual environment, and may alternatively be an orientation that the second virtual object faces and the like.

The target included angle between the first connecting line and the first ray may be an included angle in a clockwise direction or an included angle in an anticlockwise direction. This is not limited in this embodiment of this application.

In an exemplary embodiment, an implementation process of determining the target included angle between the first connecting line and the first ray includes the following operation a and operation b.

Operation a: Determine coordinate values corresponding to the location of the target marked point in a rectangular coordinate system, the location of the second virtual object being used as an origin of the rectangular coordinate system, and an axis matching the first ray being used as any coordinate axis.

The axis matching the first ray is an axis in which a positive direction of the first ray points to the reference orientation, and the axis matching the first ray may be used as any coordinate axis in the rectangular coordinate system. For example, the axis matching the first ray may be used as an X axis in the rectangular coordinate system or a Y axis in the rectangular coordinate system.

After the rectangular coordinate system is established by using the location of the second virtual object as the origin and the axis matching the first ray as any coordinate axis, the location of the target marked point is mapped to the rectangular coordinate system to obtain the coordinate values corresponding to the location of the target marked point in the rectangular coordinate system.

Operation b: Determine the target included angle between the first connecting line and the first ray based on the coordinate values.

In an exemplary embodiment, an example in which the axis matching the first ray is the Y axis in the rectangular coordinate system is used. In this case, an implementation method of determining the target included angle between the first connecting line and the first ray based on the coordinate values includes: using, based on the coordinate values, an inverse tangent to calculate a first included angle between the first connecting line and the Y axis in the clockwise direction; and determining the target included angle between the first connecting line and the first ray based on the first included angle.

In an exemplary embodiment, the first included angle is expressed by an angle of not less than 0 degrees and not greater than 360 degrees. In an exemplary embodiment, if the target included angle between the first connecting line and the first ray is the included angle in the clockwise direction, the first included angle may be directly used as the target included angle between the first connecting line and the first ray, or an included angle obtained by rounding the first included angle may be used as the target included angle between the first connecting line and the first ray. For example, a principle of rounding may be rounding up, rounding down, rounding off, or the like. In an exemplary embodiment, if the target included angle between the first connecting line and the first ray is the included angle in the anticlockwise direction, a difference between 360 degrees and the first included angle may be used as the target included angle between the first connecting line and the first ray, or an included angle obtained by rounding the difference between 360 degrees and the first included angle may be used as the target included angle between the first connecting line and the first ray. In the foregoing example, 0 to 360 degrees is used as an example. In some embodiments, a value of the included angle is still between-180 degrees and 180 degrees.

For example, a process of determining the target included angle between the first connecting line and the first ray may be shown in FIG. 3. A map corresponding to the virtual scene is regarded as a grid map with latitude and longitude lines (XY). After the location of the target marked point and the location of the second virtual object are determined, the connecting line between the location of the second virtual object and the location of the target marked point is used as the first connecting line, the ray extending from the location of the second virtual object to the north orientation is used as the first ray, the location of the second virtual object is used as the origin, and the axis matching the first ray is used as a Y axis, to establish a rectangular coordinate system shown in FIG. 3. Coordinate values (x, y) corresponding to the location of the target marked point in the rectangular coordinate system are determined, and the first included angle between the first connecting line and the Y axis is determined based on the coordinate values. For example, in FIG. 3, the first included angle between a first connecting line 300 and the Y axis is 29°, and the first included angle is used as a target included angle between the first connecting line 300 and the first ray. For example, x and y in the coordinate values (x, y) may be respectively referred to as a relative gap in the X direction and a relative gap in the Y direction between a location of a target marked point 310 and a location of a second virtual object 320.

A manner of determining the target included angle between the first connecting line and the first ray based on the foregoing operation a and operation b is only an example. This is not limited in this embodiment of this application. In an exemplary embodiment, the target included angle between the first connecting line and the first ray may alternatively be measured by an angle measuring device.

Operation B: Use an orientation obtained by deflecting from the reference orientation to the target included angle as the target orientation.

In an exemplary embodiment, if the target included angle is an included angle between the first connecting line and the first ray in the clockwise direction, the orientation obtained by deflecting from the reference orientation to the target included angle in the clockwise direction is used as the target orientation. If the target included angle is an included angle between the first connecting line and the first ray in the anticlockwise direction, the orientation obtained by deflecting from the reference orientation to the target included angle in the anticlockwise direction is used as the target orientation.

In another possible implementation, an implementation process of determining, based on the location of the target marked point and the location of the second virtual object, the target orientation in which the target marked point is located relative to the second virtual object includes the following operation one and operation two.

Operation one: Determine deviation degrees of a plurality of candidate rays from the first connecting line, the plurality of candidate rays corresponding to a plurality of candidate orientations that the second virtual object faces, any candidate ray being a ray extending from the location of the second virtual object to a candidate orientation corresponding to the any candidate ray, and the first connecting line being a connecting line between the location of the second virtual object and the location of the target marked point.

Candidate orientation that the second virtual object may face is set based on experience or flexibly adjusted based on an application scenario. This is not limited in this embodiment of this application. For example, the candidate orientation that the second virtual object may face includes 360 orientations, such as a north orientation, an orientation of one degree cast of north, an orientation of two degrees cast of north, . . . , an orientation of 89 degrees cast of north, an east orientation, an orientation of one degree south of cast, an orientation of two degrees south of east, . . . , an orientation of 89 degrees south of east, a south orientation, an orientation of one degree west of south, an orientation of two degrees west of south, . . . , an orientation of 89 degrees west of south, a west orientation, an orientation of one degree west of north, an orientation of two degrees west of north, . . . , and an orientation of 89 degrees west of north. For example, the 360 orientations may be respectively represented by 360 angles ranging from 0 degrees to 359 degrees. 0 degrees represent the north orientation, 90 degrees represents the cast orientation, 180 degrees represents the south orientation, and 270 degrees represents the west orientation.

A deviation degree of any candidate ray from the first connecting line is configured for measuring confidence that the candidate orientation corresponding to any candidate ray is the target orientation. A greater deviation degree between any candidate ray and the first connecting line indicates smaller confidence that the candidate orientation corresponding to any candidate ray is the target orientation. A smaller deviation degree between any candidate ray and the first connecting line indicates greater confidence that the candidate orientation corresponding to any candidate ray is the target orientation.

A principle of determining the deviation degrees of the candidate rays from the first connecting line is the same. An example of a manner of determining the deviation degrees of any candidate ray from the first connecting line is used for description in this embodiment of this application.

In an exemplary embodiment, the manner of determining the deviation degrees of any candidate ray from the first connecting line includes: using a minimum value of included angles between any candidate rays and the first connecting line in the clockwise direction and in the anticlockwise direction as the deviation degree of any candidate ray from the first connecting line.

In an exemplary embodiment, the manner of determining the deviation degrees of any candidate ray from the first connecting line includes: using an included angle between any candidate ray and the first ray in the clockwise (or anticlockwise) direction as a second included angle; using an included angle between the first connecting line and the first ray in the clockwise (or anticlockwise) direction as a third included angle; and using an absolute value of a difference between the second included angle and the third included angle as the deviation degree of any candidate ray from the first connecting line. The first ray is the ray extending from the location of the second virtual object to the reference orientation. The reference orientation may be an orientation among candidate orientations, or may be an orientation other than the candidate orientations.

Operation two: Use a candidate orientation corresponding to a candidate ray with a smallest deviation degree from the first connecting line among the candidate rays as the target orientation.

A greater deviation degree between any candidate ray and the first connecting line indicates smaller confidence that the candidate orientation corresponding to any candidate ray is the target orientation. Therefore, there is greatest confidence of which a candidate orientation corresponding to the candidate ray with the smallest deviation degree from the first connecting line among the various candidate rays is the target orientation. The candidate orientation corresponding to the candidate ray with the smallest deviation degree from the first connecting line among the candidate rays is used as the target orientation. This is beneficial to ensuring reliability of the determined target orientation.

A form of the target orientation is not limited in this embodiment of this application. For example, the target orientation may be expressed by an angular orientation (such as an orientation corresponding to 30° or an orientation corresponding to) 45°, may be expressed by a geographical orientation (such as a northeast orientation or a southwest orientation), or may be expressed by a clock orientation (such as an orientation of 3 o'clock or an orientation of 12 o'clock). Certainly, the target orientation may alternatively be expressed in another form. Details are not described herein again in this embodiment of this application.

Operation 203: The server generates orientation prompt information of the target marked point based on the target orientation, and transmits the orientation prompt information to the second client.

The orientation prompt information of the target marked point includes a target orientation in which the target marked point is located relative to the second virtual object. A form of the orientation prompt information is not limited in this embodiment of this application. For example, the form of the orientation prompt information includes at least one of a voice or text.

For example, an example in which the orientation prompt information includes an orientation prompt voice and orientation prompt text is used. A manner of generating the orientation prompt information of the target marked point based on the target orientation includes: filling a nickname, a target orientation, and a meaning indicated by the target marked point of the first virtual object into an orientation prompt text template to obtain orientation prompt text of the target marked point, and converting the orientation prompt text of the target marked point into a voice to obtain an orientation prompt voice of the target marked point. The meaning indicated by the target marked point is a meaning of an object marked by the target marked point. For example, if the object marked by the target marked point is a virtual object in the enemy camp of the first virtual object, the meaning indicated by the target marked point may be that there is danger.

The orientation prompt text template is set based on experience or flexibly adjusted based on an application scenario. This is not limited in this embodiment of this application. For example, the orientation prompt text template is “nickname: orientation and meaning”. An example in which the nickname of the first virtual object is “player A”, the target orientation is “an orientation corresponding to 275°”, and the meaning indicated by the target orientation is “there is danger” is used. The orientation prompt text of the target marked point may be “player A: danger at the orientation corresponding to 275°”.

Figure 4:
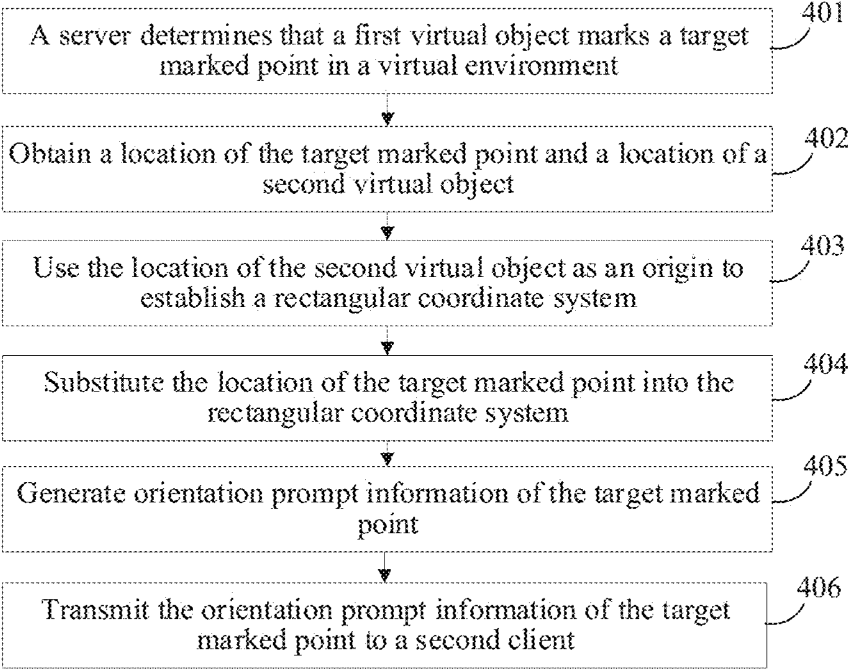
FIG. 4 is a schematic diagram of a process in which a server transmits orientation prompt information of a target marked point to a second client according to an embodiment of this application.

For example, a process of the server transmitting orientation prompt information of the target marked point to the second client is shown in FIG. 4. 401: The server determines that a first virtual object marks the target marked point in a virtual environment. 402: Obtain a location of the target marked point and a location of a second virtual object. 403: Use the location of the second virtual object as an origin to establish a rectangular coordinate system. 404: Substitute the location of the target marked point into the rectangular coordinate system to obtain coordinate values of the target marked point in the rectangular coordinate system, and determine a target orientation in which the target marked point is located relative to the second virtual object based on the coordinate values. 405: Generate orientation prompt information of the target marked point. 406: Transmit the orientation prompt information of the target marked point to the second client.

Operation 204: The second client displays the virtual environment.

The virtual environment is an environment for virtual objects to perform an activity. The second client can display the virtual environment when running on a terminal. When the second virtual object performs an activity in the virtual environment, a virtual environment picture displayed by the second client may be updated in real time.

In an exemplary embodiment, the second client displays in real time the virtual environment picture obtained by performing picture collection on the virtual environment from a perspective of the second virtual object, and may further overlay and display an interactive control on the virtual environment picture simultaneously. Types of the interactive control may be set based on experience or flexibly adjusted based on an actual application scenario. This is not limited in this embodiment of this application. For example, the interactive control includes but is not limited to a virtual object controlling control, a virtual prop selection control, an information viewing control, a marked control, and the like. For example, the virtual environment picture and the interactive control overlaid and displayed on the virtual environment picture may constitute a display interface of the terminal.

Regardless of whether the first virtual object marks the target marked point in the virtual environment, the second client displays the virtual environment. To be specific, an implementation of operation 204 is not limited to the foregoing operation 201 to operation 203.

Operation 205: The second client represents the orientation prompt information of the target marked point after the first virtual object marks the target marked point in the virtual environment, the orientation prompt information including a target orientation in which the target marked point is located relative to the second virtual object.

After the server transmits the orientation prompt information of the target marked point to the second client, the second client receives the orientation prompt information of the target marked point transmitted by the server and displays the orientation prompt information of the target marked point. Because the first virtual object already marks the target marked point in the virtual environment when the orientation prompt information of the target marked point is received, the second client displays the orientation prompt information of the target marked point after the first virtual object marks the target marked point in the virtual environment.

The orientation prompt information includes the target orientation in which the target marked point is located relative to the second virtual object. An interactive object of the second client can know the target orientation in which the target marked point is located relative to the second virtual object by displaying the orientation prompt information.

In an exemplary embodiment, a manner of expressing the orientation prompt information includes at least one of an orientation prompt voice or orientation prompt text. In a case that the orientation prompt information includes the orientation prompt text, a process of the second client displaying the orientation prompt information of the target marked point includes: The second client displays the orientation prompt text of the target marked point in the display interface. A location of the orientation prompt text displayed in the display interface of the second client is not limited in this embodiment of this application, which may be set based on experience or be flexibly adjusted based on an actual application scenario. In an exemplary embodiment, when the orientation prompt information includes the orientation prompt voice, a process of the second client displaying the orientation prompt information of the target marked point includes: The second client plays back the orientation prompt voice of the target marked point.

In some embodiments, the orientation prompt information is displayed in a first prompt area of a terminal interface in response to that the first virtual object marks the target marked point in the virtual environment, or the orientation prompt information is played back by using an audio playback component in response to that the first virtual object marks the target marked point in the virtual environment.

In some embodiments, picture recognition is performed on a virtual environment picture displayed on the terminal interface to obtain a first prompt area that meets an information display requirement. The information display requirement is configured for constraining virtual environment content displayed in the first prompt area. In some embodiments, picture content recognition is performed on the virtual environment picture displayed on the terminal interface to obtain an area in which target display content in the virtual environment picture is displayed, and the first prompt area is determined in an area in the terminal interface other than the area in which the target display content is displayed. For example, the picture content recognition is performed on the virtual picture screen to obtain the display area of the virtual object in the virtual environment picture, to meet constraints of the display area to determine the first prompt area.

In some embodiments, the terminal interface further includes an orientation coordinate axis, and the orientation coordinate axis is configured for using the orientation of the second virtual object as a center to display the plurality of orientation distribution intervals. When the orientation prompt information is displayed, a prompt mark may alternatively be displayed at a location corresponding to the target orientation on the orientation coordinate axis. The prompt mark is configured for indicating that the target marked point exists in a direction corresponding to the target orientation on the orientation coordinate axis.

There may be one or more second virtual objects. The same target marked point may have different target orientations relative to different second virtual objects. Different second clients controlling different second virtual objects receive different orientation prompt information of the same target marked point. To be specific, although the orientation prompt information received by a plurality of second clients is about the same target marked point, because the second virtual objects controlled by different second clients have different locations, the target orientations prompted by the orientation prompt information received by the plurality of second clients are different, so that an interactive object of each second client can quickly find the target marked point.

For example, an example in which the second virtual object is a virtual object in the same camp as the first virtual object (in other words, the second virtual object is a teammate of the first virtual object) is used. Assuming that there are two second virtual objects, namely teammate 1 and teammate 2, a relationship between teammate 1, teammate 2, the target marked point, and the location of the first virtual object is shown in FIG. 5.

Figure 5:
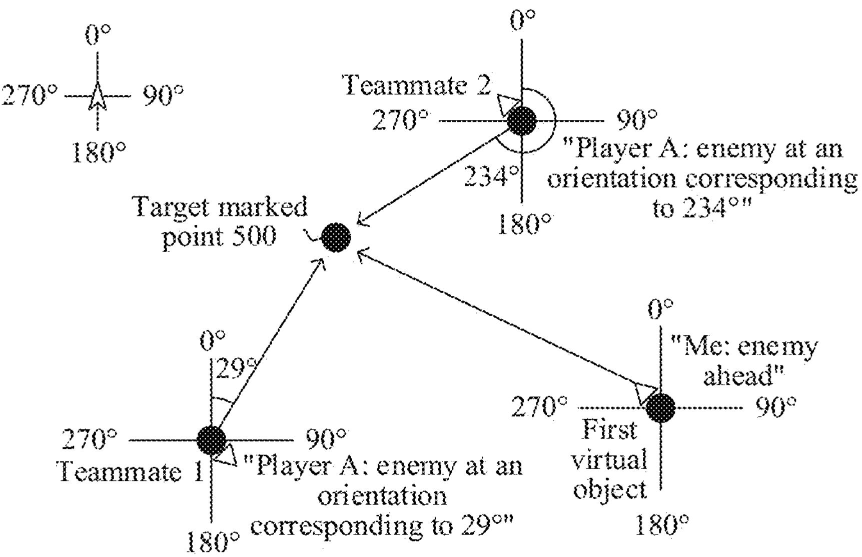
FIG. 5 is a schematic diagram of relationships between locations of teammate 1, teammate 2, a target marked point, and a first virtual object according to an embodiment of this application.

Under the relationship shown in FIG. 5, a target orientation in which the target marked point 500 is located relative to teammate 1 is "an orientation corresponding to 29°", and a target orientation in which the target marked point 500 is located relative to teammate 2 is "an orientation corresponding to 234°". An example in which a meaning indicated by the target marked point 500 is that there is an enemy, and a nickname of the first virtual object is "player A" is used. Orientation prompt information received by the second client controlling teammate 1 may be "player A: enemy at the orientation corresponding to 29°". Orientation prompt information received by the second client controlling teammate 2 may be "player A: enemy at the orientation corresponding to 234°". The first client controlling the first virtual object may locally display the orientation prompt information "me: there is an enemy ahead".

Figure 6:
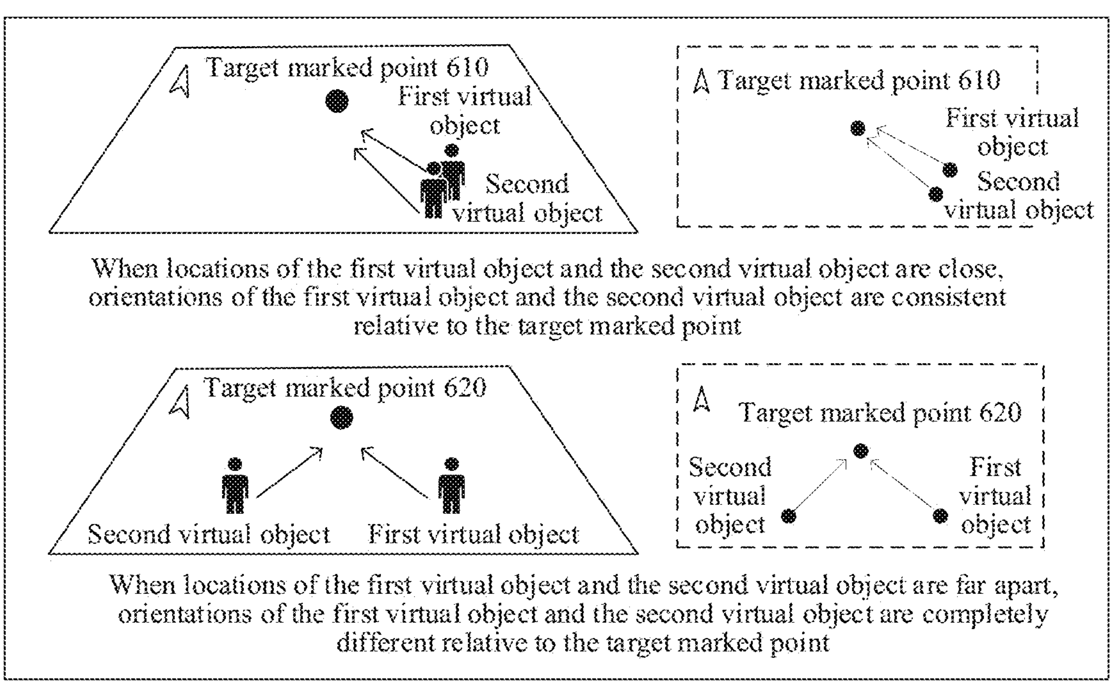
FIG. 6 is a schematic diagram of an orientation in which a target marked point is located relative to a first virtual object and a second virtual object according to an embodiment of this application.

In the related art, orientation prompt information received by the second client is information including an orientation in which the target marked point is located relative to the first virtual object. As shown in FIG. 6, when locations of a second virtual object and a first virtual object are close, orientations of the second virtual object and the first virtual object are basically the same relative to a target marked point 610. However, when the locations of the second virtual object and the first virtual object are far apart, orientations of the second virtual object and the first virtual object are completely different relative to a target marked point 620. In this case, a second client does not quickly position the target marked point 620 based on received orientation prompt information, and effectiveness of the orientation prompt information is low, resulting in low effectiveness of displaying a virtual environment picture including the target marked point. In this embodiment of this application, orientation prompt information received by the second client includes a target orientation in which the target marked point is located relative to the second virtual object. Effectiveness of the orientation prompt information is high, so that it is beneficial to improving the efficiency of displaying the virtual environment picture including the target marked point.

Operation 206: The second client displays the target marked point in the virtual environment in response to receiving an operation of changing an orientation of the second virtual object to the target orientation.

Because the orientation prompt information of the target marked point includes the target orientation in which the target marked point is located relative to the second virtual object, after the second client displays the orientation prompt information of the target marked point, an interactive object of the second client can generate an operation for displaying the virtual environment picture including the target marked point under prompt of the orientation prompt information of the target marked point, so that the second client displays the virtual environment picture including the target marked point based on the operation generated by the interactive object.

In this embodiment of this application, the operation generated by the interactive object for displaying the virtual environment picture including the target marked point includes an operation of changing the orientation of the second virtual object to the target orientation. Before operation 206 is implemented, the second client needs to obtain the operation of changing the orientation of the second virtual object to the target orientation. In a possible implementation, a manner of obtaining the operation of changing the orientation of the second virtual object to the target orientation includes but is not limited to the following manners one to three.

Manner one: Display candidate orientations; and use a trigger operation of a target orientation among the candidate orientation as the operation of changing the orientation of the second virtual object to the target orientation.

Manner one may occur when the target orientation is one of the candidate orientations that the second virtual object may face. For an introduction to the candidate orientation that the second virtual object can face, refer to operation 202. Details are not described herein again.

In an exemplary embodiment, an implementation process of displaying the candidate orientations includes: displaying the candidate orientations in a list in a display interface. For example, the list may be displayed at any location on the display interface. This is not limited in this embodiment of this application. For example, the list is displayed at a bottom location of the display interface.

In an exemplary embodiment, an implementation process of displaying the candidate orientations further includes: displaying the candidate orientations in an orientation joystick in the display interface. The orientation joystick has a plurality of scales, and each scale corresponds to a candidate orientation. Any candidate orientation may be represented by an angle or an identification letter. For example, the orientation joystick may be displayed at any location on the display interface. This is not limited in this embodiment of this application. For example, the orientation joystick is displayed at a top location of the display interface.

For example, displaying the candidate orientations may refer to displaying all candidate orientations simultaneously, or may refer to displaying some candidate orientations first, and then displaying remaining candidate orientations based on a sliding operation, expansion operation, or the like. This is not limited in this embodiment of this application.

In some embodiments, the orientation joystick may further be expressed as an orientation coordinate axis. The orientation coordinate axis is configured for using an orientation of a second object as a center to display a plurality of orientation distribution. The target marked point in the virtual environment is determined in response to receiving a trigger operation on the target orientation on the orientation coordinate axis.

For example, an example in which the candidate orientations are displayed in the orientation joystick in the display interface is used. The orientation joystick configured for displaying the candidate orientation is shown in 701 in FIG. 7. In 701, some candidate orientations from an orientation corresponding to 60 degrees to an orientation corresponding to 150 degrees are displayed in the orientation joystick. E is an identification letter of an orientation corresponding to 90 degrees, indicating an east orientation. SE is an identification letter of an orientation corresponding to 145 degrees, indicating a southeast orientation. The orientation joystick supports a sliding operation. The remaining candidate orientations may be displayed based on the sliding operation.

All of the displayed candidate orientations may be triggered, and an interactive object can trigger a target orientation in the displayed candidate orientations, so that a second client obtains a trigger operation of the target orientation among the candidate orientations. After obtaining the trigger operation of the target orientation among the candidate orientations, the second client uses the trigger operation of the target orientation among the candidate orientations as an operation for changing an orientation of a second virtual object to a target orientation.

Manner two: Display an orientation fill-in box; and use a confirmation operation of a target orientation in the orientation fill-in box as the operation of changing the orientation of the second virtual object to the target orientation.

For example, the orientation fill-in box may be displayed in a display interface by default, or may be displayed in the display interface based on a corresponding shortcut operation of the orientation fill-in box. This is not limited in this embodiment of this application. The corresponding shortcut operation of the orientation fill-in box is set based on experience or flexibly adjusted based on an application scenario. The corresponding shortcut operation of the orientation fill-in box is used as a trigger operation of a target button.

For example, the target orientation filled in the orientation fill-in box may be a target orientation filled in by the interactive object, or may be a target orientation automatically filled in by the second client based on the orientation prompt information of the target marked point. This is not limited in this embodiment of this application. In some embodiments, the target marked point is displayed in the virtual environment in response to receiving a fill-in confirmation operation on the target orientation in the orientation fill-in box.

For example, the orientation fill-in box filled with the target orientation has a confirmation control and a cancel control. A confirmation operation of the target orientation filled in the orientation fill-in box is obtained in response to a trigger operation of the confirmation control in the orientation fill-in box. After the second client obtains the confirmation operation of the target orientation filled in the orientation fill-in box, the confirmation operation of the target orientation in the orientation fill-in box is used as the operation of changing the orientation of the second virtual object to the target orientation.

Manner three: Display a current orientation that the second virtual object faces in real time; and use an orientation changing operation stopped when the orientation displayed in real time is the target orientation as the operation of changing the orientation of the second virtual object to the target orientation.

Figure 7:
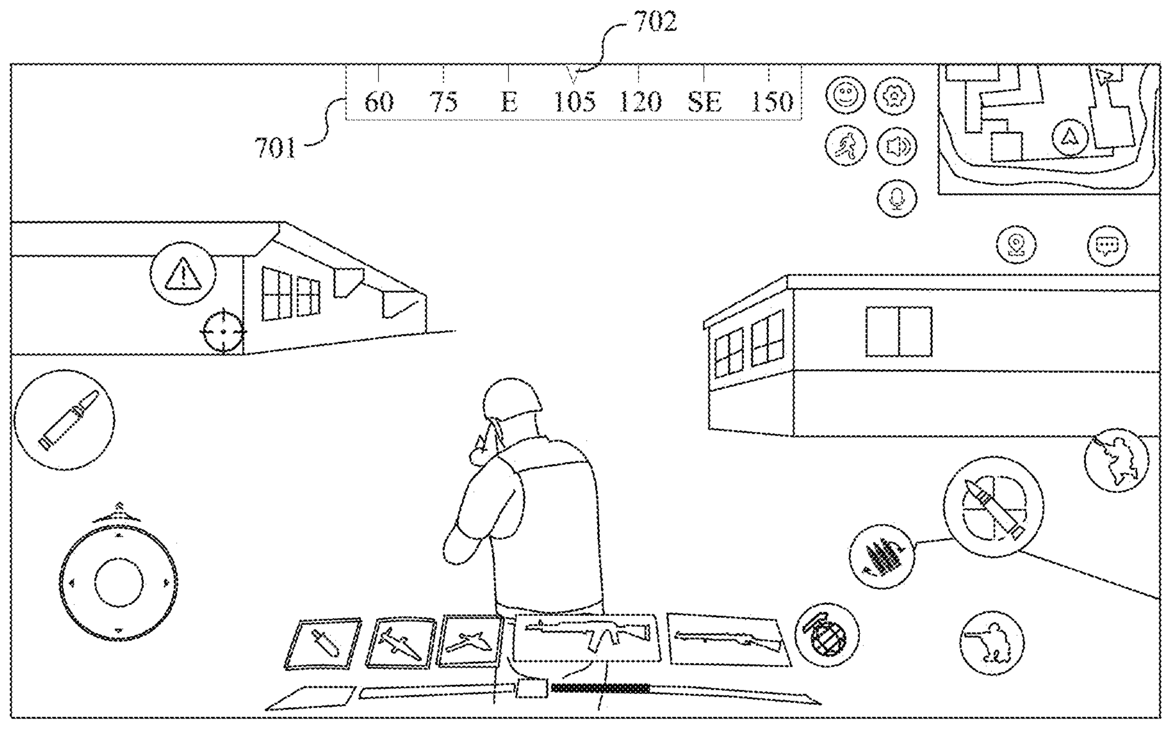
FIG. 7 is a schematic diagram of an orientation joystick according to an embodiment of this application.

Real-time display of the current orientation that the second virtual object faces can intuitively prompt of which orientation the interactive object already changes the second virtual object to. The current orientation of the second virtual object displayed in real time is not limited in this embodiment of this application. For example, when the candidate orientations are displayed in the orientation joystick, the orientation joystick is slid in real time based on the current orientation that the second virtual object faces, so that the orientation displayed in middle of the orientation joystick is always the current orientation that the second virtual object faces. In other words, the current orientation that the second virtual object faces is displayed in real time in the middle of the orientation joystick. For example, an indication mark may be displayed in the middle of the orientation joystick to highlight the current orientation that the second virtual object faces. For example, as shown in FIG. 7, an indicator mark 702 may be an inverted triangle-shaped mark.

For example, the current orientation of the second virtual object may alternatively be displayed in real time in a target area in the display interface. The target area is set based on experience or flexibly adjusted based on an application scenario. For example, the target area is an upper left corner area or a lower right corner area.

The interactive object may generate the orientation changing operation. For example, the interactive object may generate an orientation changing operation by rotating a finger in a display screen of the second client, or the interactive object may generate an orientation changing operation by using a joystick. The orientation changing operation is a continuous operation. When the interactive object finds that the orientation displayed in real time is the target orientation, the orientation changing operation may be stopped, and then the second client obtains the orientation changing operation stopped when the orientation displayed in real time is the target orientation. After obtaining the orientation changing operation stopped when the orientation displayed in real time is the target orientation, the second client uses an orientation changing operation stopped when the orientation displayed in real time is the target orientation as the operation of changing the orientation of the second virtual object to the target orientation.

In a case that the operation of changing the orientation of the second virtual object to the target orientation is obtained by using manner one and manner two above, the second client may change the orientation of the second virtual object to the target orientation after obtaining the operation of changing the orientation of the second virtual object to the target orientation. In a case that the operation of changing the orientation of the second virtual object to the target orientation is obtained by using manner three above, the second client changes the orientation of the second virtual object to the target orientation when obtaining the operation of changing the orientation of the second virtual object to the target orientation.

After obtaining the operation of changing the orientation of the second virtual object to the target orientation, in response to an operation of changing an orientation of the second virtual object to the target orientation, the second client displays a target virtual environment picture including the target marked point. The target virtual environment picture is a picture for the interactive object to view a surrounding situation of the target marked point.

According to the method in embodiments of this application, the orientation prompt information obtained by the client controlling the second virtual object includes the target orientation in which the target marked point is located relative to the second virtual object. Such orientation prompt information can clearly prompt a relationship between the target marked point and the second virtual object in orientation, and the orientation prompt information has high effectiveness. Under prompt of such orientation prompt information, interactive objects can enable the client to display the virtual environment picture including the target marked point by using the operation of changing the orientation of the second virtual object to the target orientation. Operation convenience of displaying the virtual environment picture including the target marked point is high, efficiency of displaying the virtual environment picture including the target marked point is improved, and a human-machine interaction rate and interactive experience of the interactive objects are improved.

According to the method provided in this embodiment, orientation prompts are given in many ways by displaying the orientation prompt information or playing the orientation prompt information. Without affecting a game interaction performed by the interactive object, broadcast of voice prompt information is given, and the location of the target marked point is prompted to the interactive object. This improves human-machine interaction efficiency, avoids a blind search for the target marked point by the interactive object, and avoids waste of computer resources.

According to the method provided in this embodiment, the target display content in the virtual environment picture is recognized to constrain the location of the first prompt area by the display area of the target display content, so that the display of the orientation prompt information is prevented from blocking the target display content in the virtual environment picture, and prompt efficiency is reduced.

According to the method provided in this embodiment, the prompt mark is displayed on the target orientation in which the target marked point is located on the orientation coordinate axis, so that prompting effectiveness of the orientation prompt information is improved. Because the interactive object can directly adjust the orientation by using the orientation coordinate axis, a purpose and efficiency of the orientation adjustment are further improved.

In a possible implementation, in response to an operation of changing an orientation of the second virtual object to the target orientation, an implementation process of the second client displaying a target virtual environment picture including the target marked point includes the following operation 2061 to operation 2064.

Operation 2061: The second client performs picture collection on the virtual environment from a perspective of the second virtual object facing the target orientation.

In an exemplary embodiment, the perspective of the second virtual object facing the target orientation may be a first-person perspective, a third-person perspective, or the like. This is not limited in this embodiment of this application.

In an exemplary embodiment, the second virtual object may be displayed in the collected virtual environment picture. In a case that the perspectives of the second virtual object facing the target orientation are different, situations of the second virtual object displayed in the collected virtual environment picture are different. For example, from the third-person perspective of the second virtual object facing the target orientation, a complete or half-length second virtual object is displayed in the collected virtual environment picture. From the first-person perspective of the second virtual object facing the target orientation, part of the second virtual object, such as a hand of the second virtual object, is displayed in the collected virtual environment picture.

In an exemplary embodiment, other than the second virtual object, another virtual object and an environmental element may also be displayed in the collected virtual environment picture. For example, another virtual object may be a virtual object controlled by another client, such as a first virtual object controlled by a first client, may be a non-player-controlled virtual object that is not controlled by any client, or the like.

For example, an example in which the perspective of the second virtual object is the third-person perspective is used. A virtual environment picture collected before and after the orientation of the second virtual object is changed to the target orientation are shown in FIG. 8. A virtual environment picture displayed in section (1) of FIG. 8 is a virtual environment picture collected before the orientation of the second virtual object 810 is changed to the target orientation. A virtual environment picture displayed in section (2) of FIG. 8 is a virtual environment picture collected after the orientation of the second virtual object 810 is changed to the target orientation.

In an exemplary embodiment, a location of the second virtual object is referred to as a first location, and a collected virtual environment picture is a picture collected by performing picture collection on the virtual environment from the perspective of the second virtual object facing the target orientation and at the first location under a first picture collection range. The first picture collection range refers to a picture collection range set in the second client when the orientation of the second virtual object is changed to the target orientation.

Operation 2062: Determine whether the collected virtual environment picture includes a target marked point; perform operation 2063 in response to that the collected virtual environment picture includes the target marked point; and perform operation 2064 in response to that the collected virtual environment picture does not include the target marked point.

Operation 2063: Use, in response to that the collected virtual environment picture includes the target marked point, the collected virtual environment picture as a target virtual environment picture and display the target virtual environment picture.

In other words, when the collected virtual environment picture includes the target marked point, an interactive object of the second client does not need to perform another operation to enable the second client to display the target virtual environment picture including the target marked point.

Operation 2064: Obtain a marked point positioning operation in response to that a collected virtual environment picture does not include the target marked point, the marked point positioning operation being configured for enabling the displayed virtual environment picture to include the target marked point when the second virtual object faces the target orientation; and use the virtual environment picture matching the marked point positioning operation as the target virtual environment picture and display the target virtual environment picture.

The collected virtual environment picture not including the target marked point indicates that a location of the target marked point is far from the location of the second virtual object. At this time, if the displayed virtual environment picture is enabled to include the target marked point, the interactive object of the second client may generate a marked point positioning operation. The marked point positioning operation is configured for enabling the displayed virtual environment picture to include the target marked point when the second virtual object faces the target orientation.

After obtaining the marked point positioning operation, the second client uses the virtual environment picture matching the marked point positioning operation as the target virtual environment picture and displays the target virtual environment picture. Because the marked point positioning operation is configured for enabling the displayed virtual environment picture to include the target marked point when the second virtual object faces the target orientation, the virtual environment picture matching the marked point positioning operation includes the target marked point. The virtual environment picture matching the marked point positioning operation is used as the target virtual environment picture, which can ensure that the target virtual environment picture includes the target marked point.

A type of a marked point positioning operation is not limited in this embodiment of this application. Under different types of marked point positioning operations, manners of determining the virtual environment picture matching the marked point positioning operation are also different.

In an exemplary embodiment, the marked point positioning operation includes at least one of a picture collection range expansion operation, an operation of controlling movement of the second virtual object to the target orientation, or an operation of controlling the second virtual object to observe by using a scope. The picture collection range expansion operation is configured for expanding a picture collection range referenced for collecting the virtual environment picture, to enable the displayed virtual environment picture to include the target marked point. The operation of controlling movement of the second virtual object to the target orientation is configured for shortening a distance between the location of the second virtual object and the location of the target marked point, to enable the displayed virtual environment picture to include the target marked point. The operation of controlling the second virtual object to observe by using a scope is configured for controlling the second virtual object to observe the virtual environment by using a scope (such as a telescope prop or a scope assembled on a virtual firearm prop), so that a lone of sight for observing a long-distance virtual environment is expanded, to enable the displayed virtual environment picture to include the target marked point.

For example, for a case that the marked point positioning operation includes the picture collection range expansion operation, a manner of determining the virtual environment picture matching the marked point positioning operation includes: expanding, based on the picture collection range expansion operation, the first picture collection range is to obtain a second picture collection range. Under the second picture collection range, the picture collection is performed on the virtual environment from the perspective of the second virtual object facing the target orientation and at the first location, and the virtual environment picture matching the marked point positioning operation is obtained.

For example, for a case that the marked point positioning operation includes the operation of controlling movement of the second virtual object to the target orientation, a manner of determining the virtual environment picture matching the marked point positioning operation includes: moving the second virtual object based on the operation of controlling movement of the second virtual object from the first location to the target orientation, and a location of the moved second virtual object being referred to as a second location. Under the first picture collection range, the picture collection is performed on the virtual environment from the perspective of the second virtual object facing the target orientation and at the second location, and the virtual environment picture matching the marked point positioning operation is obtained.

For example, when the marked point positioning operation includes the operation of controlling the second virtual object to observe by using a scope, when an operation of using the scope is received, a scope observation picture is displayed which includes an outline of the scope. The outline includes an enlarged display of the virtual environment, and the virtual environment picture matching the marked point positioning operation is obtained.

In an exemplary embodiment, a real-time distance between the second virtual object and the target marked point may be displayed in a reference area corresponding to the target marked point in the target virtual environment picture to enhance a prompt effect on the interactive object of the second client. The reference area corresponding to the target marked point is set based on experience or flexibly adjusted based on an application scenario. This is not limited in this embodiment of this application. For example, the reference area corresponding to the target marked point may be a specific area above the target marked point, a specific area below the target marked point, a specific area of the target marked point itself, or the like. A shape of the reference area is not limited in this embodiment of this application. For example, the reference area may be rectangular or circular.

Figure 9:
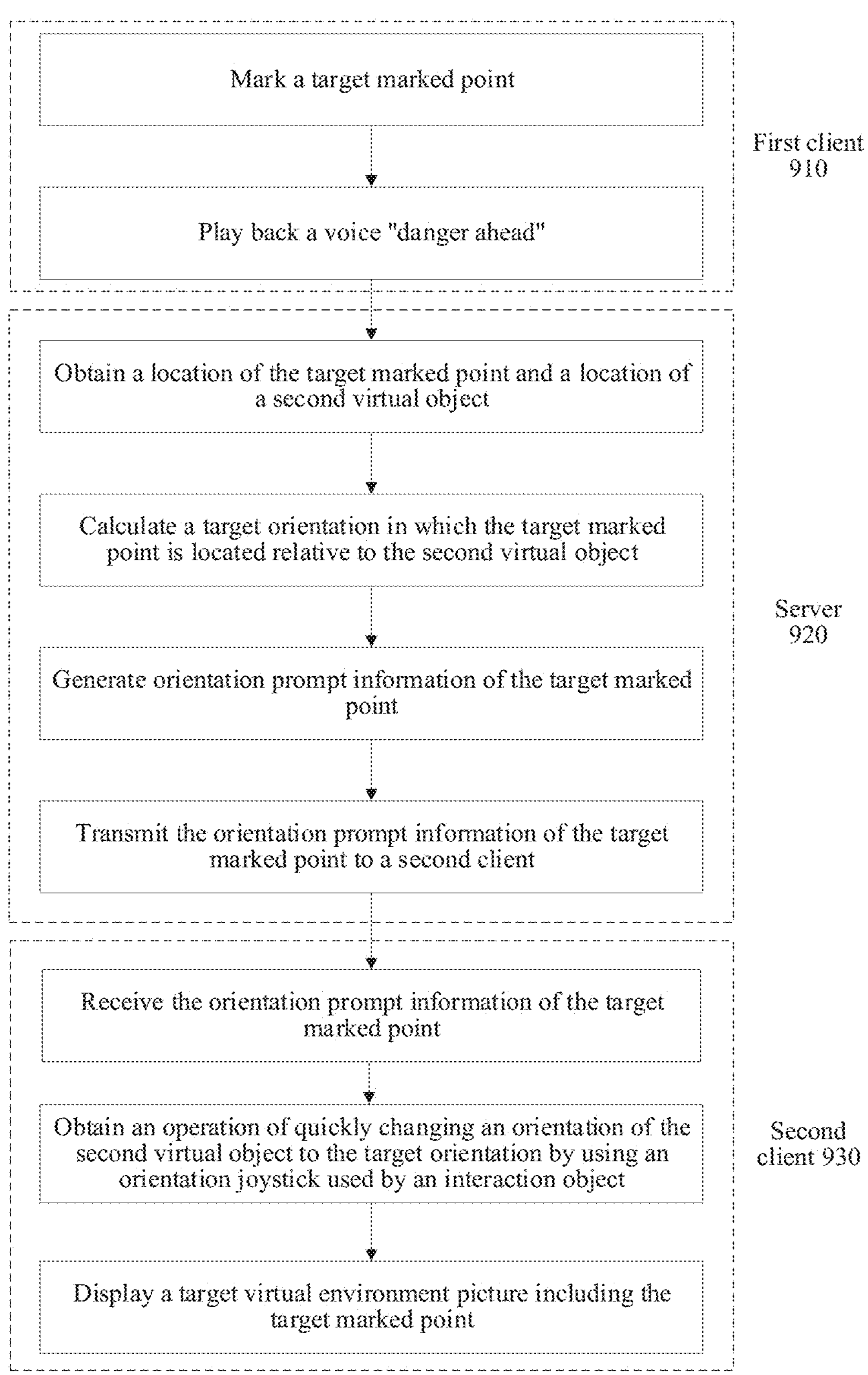
FIG. 9 is a flowchart of an implementation of a picture display method according to an embodiment of this application.

For example, an implementation process of the picture display method is shown in FIG. 9. A first client 910 marks a target marked point, and the first client 910 plays back a voice "danger ahead". A server 920 obtains a location of the target marked point and a location of a second virtual object; calculates a target orientation in which the target marked point is located relative to the second virtual object based on the location of the target marked point and the location of the second virtual object; and generates orientation prompt information of the target marked point based on the target orientation and transmits the orientation prompt information of the target marked point to a second client 930. The second client 930 receives the orientation prompt information of the target marked point, such as "danger in the target orientation". The second client 930 obtains an operation of quickly changing an orientation of the second virtual object to the target orientation by using an orientation joystick used by an interactive object. The second client 930 displays a target virtual environment picture including the target marked point based on the operation of changing the orientation of the second virtual object to the target orientation.

For example, an example in which a nickname of a first virtual object is "player A" and there is two second virtual objects, namely teammate 1 and teammate 2 is used. A second client controlling teammate 1 is referred to as client 1. A second client controlling teammate 2 is referred to as client 2. A display interface in a first client is shown in FIG. 10. An interactive object of the first client double-taps a marked control 1001 when a first virtual object faces a south orientation. The first client marks a target marked point 1002 in the south orientation. The target marked point 1002 appears in the display interface in the first client, and a message "enemy ahead" appears on a right side.

After determining that the first virtual object marks the target marked point 1002 in a virtual environment, based on a location of the target marked point 1002 and a location of teammate 1, a server calculates that a target orientation in which the target marked point 1002 is located relative to teammate 1 is an orientation corresponding to 320°, and then transmits orientation prompt information "player A: enemy at the orientation corresponding to 320°" to client 1. When client 1 receives the orientation prompt information, teammate 1 faces an orientation corresponding to 105°. A display interface in client 1 is shown in section (1) of FIG. 11. A message "player A: enemy at an orientation corresponding to 320°" is displayed on the right side of the display interface shown in section (1) of FIG. 11. The virtual environment picture in the display interface shown in section (1) of FIG. 11 does not include the target marked point 1002.

After viewing the orientation prompt information, the interactive object of client 1 may use an orientation joystick to perform an operation of changing the orientation of teammate 1 to the corresponding orientation of 320°. Under this operation, client 1 can change the orientation of teammate 1 to the corresponding orientation of 320°, and display the display interface shown in section (2) of FIG. 11. A message "player A: enemy at the orientation corresponding to 320°" is displayed on the right side of the display interface shown in section (2) of FIG. 11. The virtual environment picture in the display interface shown in section (2) of FIG. 11 includes the target marked point 1002.

Figure 12:
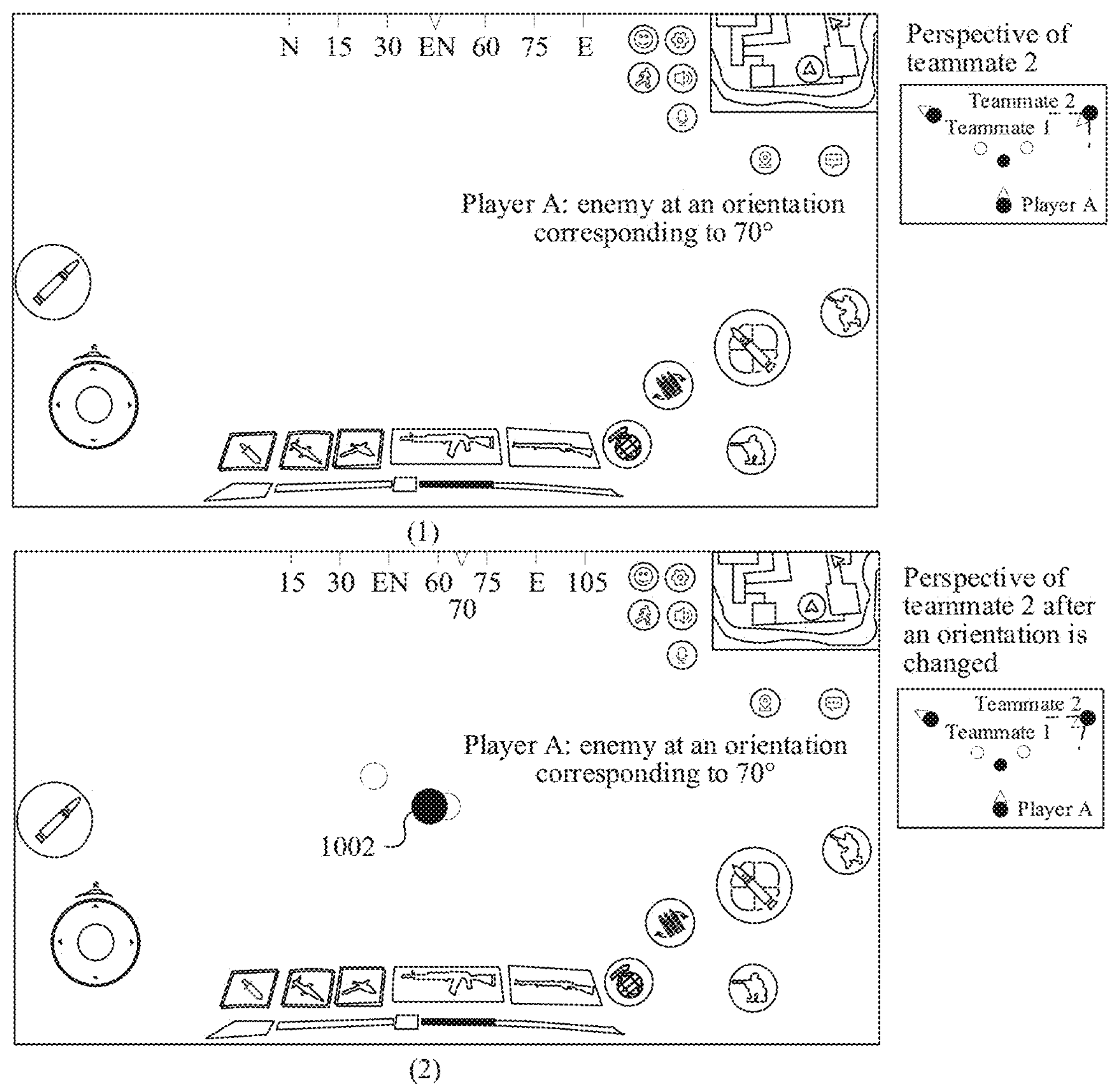
FIG. 12 is a schematic diagram of a display interface according to an embodiment of this application.

After determining that the first virtual object marks the target marked point 1002 in a virtual environment, based on a location of the target marked point 1002 and a location of teammate 2, a server calculates that a target orientation in which the target marked point 1002 is located relative to teammate 2 is an orientation corresponding to 70°, and then transmits orientation prompt information "player A: enemy at the orientation corresponding to 70°" to client 2. When client 2 receives the orientation prompt information, teammate 2 faces an orientation of EN identification (that is, an orientation corresponding to 45°, a northeast orientation). A display interface in client 2 is shown in section (1) of FIG. 12. A message "player A: enemy at an orientation corresponding to 70°" is displayed on the right side of the display interface shown in section (1) of FIG. 12. The virtual environment picture in the display interface shown in section (1) of FIG. 12 does not include the target marked point 1002.

After viewing the orientation prompt information, the interactive object of client 2 may use an orientation joystick to perform an operation of changing the orientation of teammate 2 to the corresponding orientation of 70°. Under this operation, client 2 can change the orientation of teammate 2 to the corresponding orientation of 70°, and display the display interface shown in section (2) of FIG. 12. A message "player A: enemy at the orientation corresponding to 70°" is displayed on the right side of the display interface shown in section (2) of FIG. 12. The virtual environment picture in the display interface shown in section (2) of FIG. 12 includes the target marked point 1002.

Figure 13:
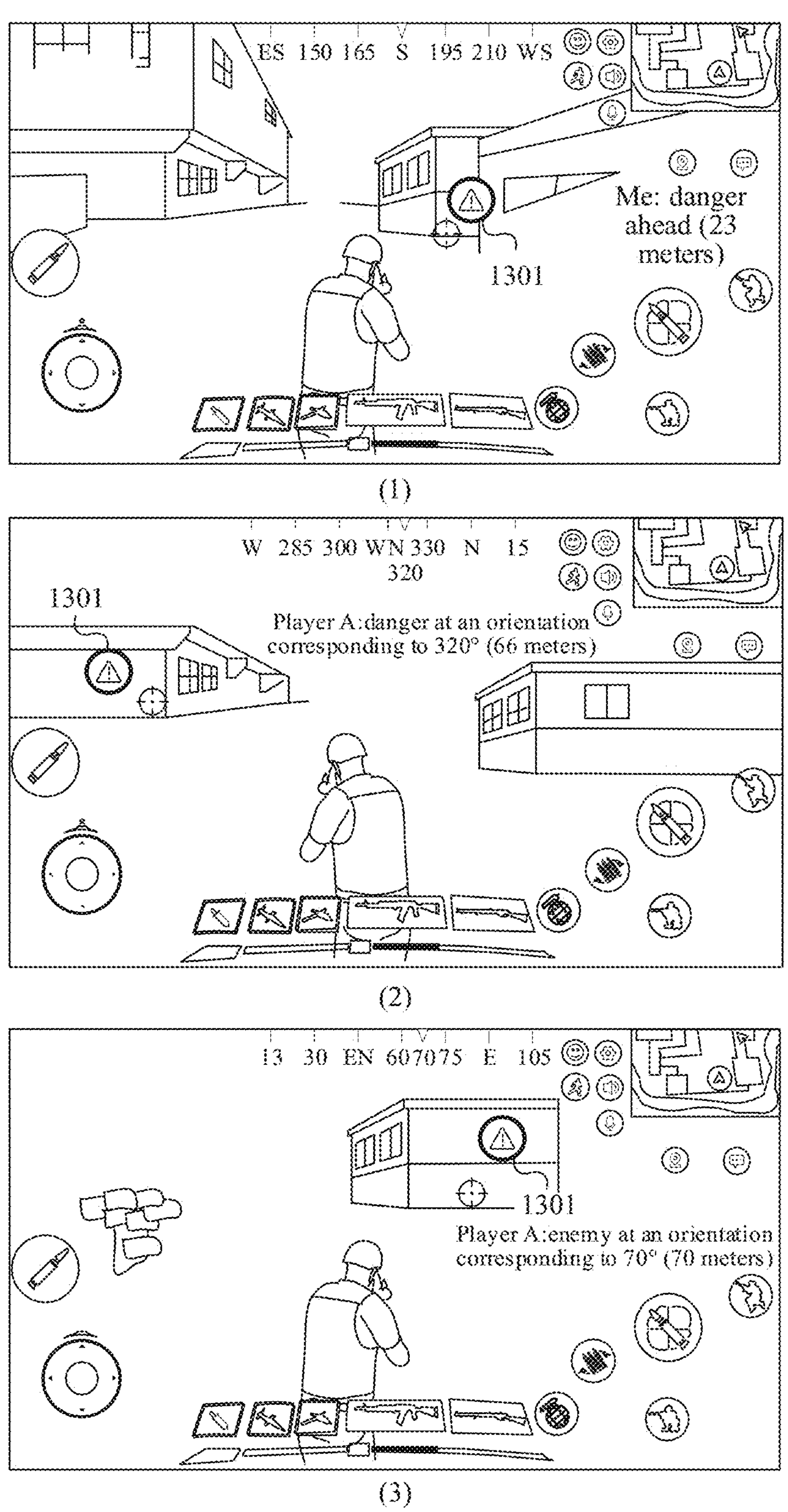
FIG. 13 is a schematic diagram of a display interface according to an embodiment of this application.

In some embodiments, a display interface in the first client may alternatively be shown in section (1) of FIG. 13. The display interface shown in section (1) of FIG. 13 is an interface displayed after a first virtual object facing a south orientation (an orientation identified by an identification letter S) marks a target marked point 1301 ahead. A message "me: danger ahead (23 meters)" is displayed on the right side of the display interface shown in section (1) of FIG. 13. "23 meters" refers to a current distance between the first virtual object and the target marked point 1301.

Assuming that the target orientation in which the target marked point 1301 is located relative to teammate 1 is an orientation corresponding to 320°, after an orientation of teammate 1 is changed to the orientation corresponding to 320°, a display interface of client 1 may be shown in section (2) of FIG. 13. A message "player A: danger at the orientation corresponding to 320° (66 meters)" is displayed in the display interface shown in section (2) of FIG. 13. "66 meters" refers to a current distance between teammate 1 and target marked point 1301.

Assuming that the target orientation in which the target marked point 1301 is located relative to teammate 2 is an orientation corresponding to 70°, after an orientation of teammate 2 is changed to the orientation corresponding to 70°, a display interface of client 2 may be shown in section (3) of FIG. 13. A message "player A: danger at the orientation corresponding to 70° (70 meters)" is displayed in the display interface shown in section (3) of FIG. 13. "70 meters" refers to a current distance between teammate 2 and target marked point 1301.

The picture display method provided in this embodiment of this application may be applied to a scenario where the first virtual object needs to synchronize the orientation prompt information of the target marked point (a marked point obtained by marking a virtual object in an opposing camp) to the second virtual object (such as a teammate of the first virtual object) through a voice or text. The target orientation in which the target marked point is located relative to the second virtual object (one of the 360 candidate orientations that the second virtual object may face) is determined based on a location relationship between the target marked point and the second virtual object. Then, the orientation prompt information including the target orientation is transmitted to the second client controlling the second virtual object, so that the target orientation prompted by the orientation prompt information has high directivity for the second virtual object, to help the interactive object of the second client quickly understand the orientation in which the target marked point is located relative to the second virtual object, and the interactive object of the second client can obtain the orientation prompt information without additional conversion thinking and determining. The interactive object of the second client can quickly position the target marked point by using the orientation joystick, to improve efficiency of the interactive object of the second client in finding the target marked point, in other works, to improve efficiency of the second client in displaying the virtual environment picture including the target marked point.

For example, the 360 candidate orientations that the second virtual object may face may be regarded as 360 fixed candidate orientations determined based on an orientation of a map of a virtual scene (or a unified coordinate system in the virtual environment). For example, an orientation corresponding to 0° among the 360 candidate orientations is a north orientation of the map of the virtual scene, and an orientation corresponding to 180° is a south orientation of the map of the virtual scene.

In other words, in the method provided in this embodiment of this application, a fixed virtual environment orientation in the client and the orientation joystick of the virtual object itself can be used to improve high directivity for different virtual objects after the orientation prompt information of the target marked point is transmitted, so that effectiveness of orientation prompt information transmission is improved, a time interval between a period of the interactive object receiving the orientation prompt information and a period of finding the target marked point is reduced, and efficiency of information communication is improved.

According to the method in embodiments of this application, the orientation prompt information obtained by the client controlling the second virtual object includes the target orientation in which the target marked point is located relative to the second virtual object. Such orientation prompt information can clearly prompt a relationship between the target marked point and the second virtual object in orientation, and the orientation prompt information has high effectiveness. Under prompt of such orientation prompt information, interactive objects can enable the client to display the virtual environment picture including the target marked point by using the operation of changing the orientation of the second virtual object to the target orientation. Operation convenience of displaying the virtual environment picture including the target marked point is high, efficiency of displaying the virtual environment picture including the target marked point is improved, and a human-machine interaction rate and interactive experience of the interactive objects are improved.

According to the method provided in this embodiment, when the target marked point cannot be displayed during facing the target orientation, the marked point positioning operation is used to expand a field of view of the second virtual object or shorten a distance between the second virtual object and the target marked point, so that the target marked point is visible to the second virtual object, to improve observation efficiency for the target marked point.

According to the method provided in this embodiment, an orientation is selected on the orientation coordinate axis, so that the second virtual object is controlled to rotate to a perspective facing the selected target orientation, and the target marked point is displayed within a line of sight of the second virtual object, to improving efficiency of controlling a viewing angle direction of the second virtual object, and avoid wasting computer resources caused by repeated control of the viewing angle.

According to the method provided in this embodiment, the orientation value of the target orientation is filled in the fill-in box, so that the second virtual object is rotated to a perspective facing the target orientation, to improve accuracy of perspective control.

Figures 14, 15:
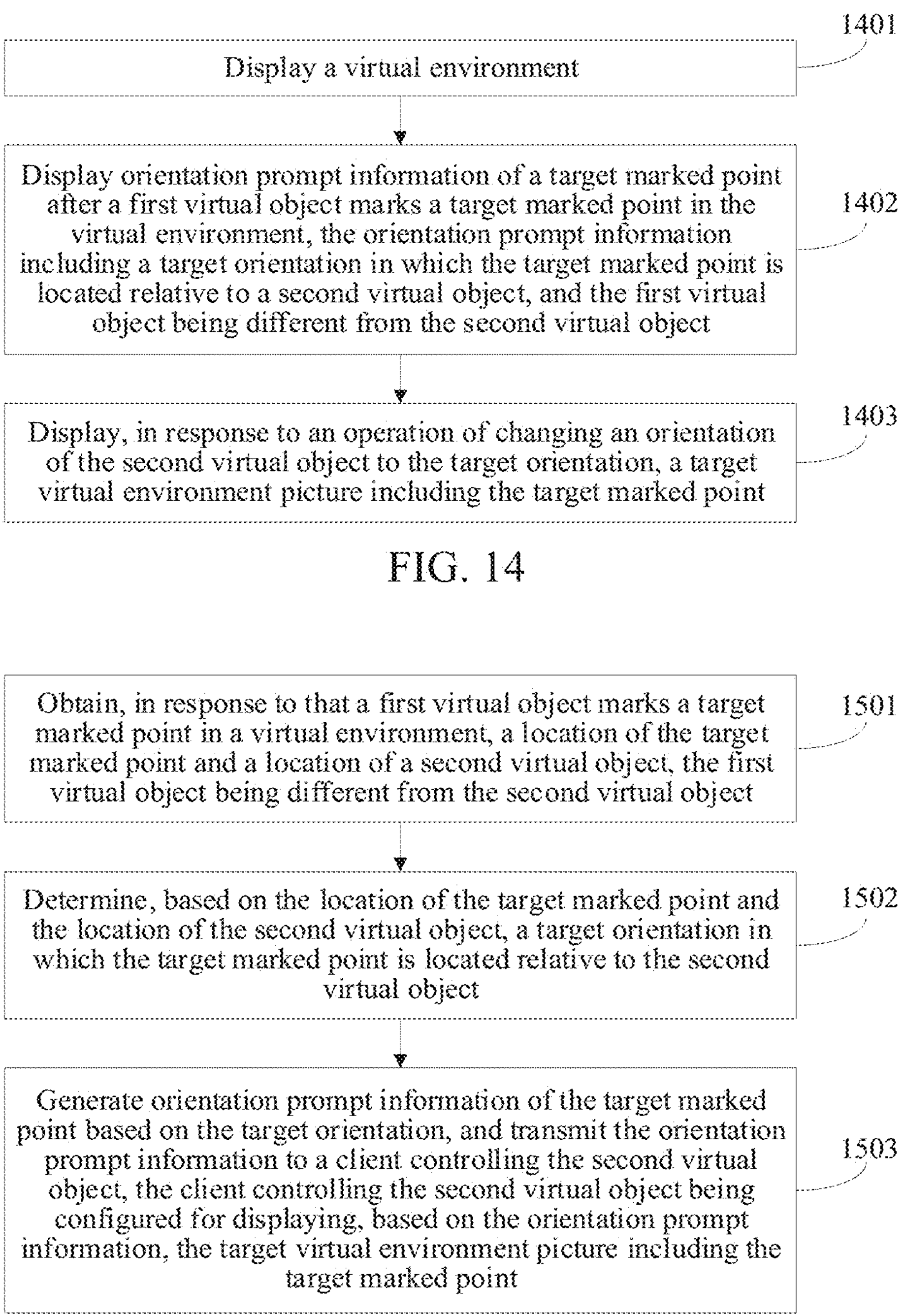
FIG. 14 is a flowchart of a picture display method according to an embodiment of this application.
FIG. 15 is a flowchart of a picture display method according to an embodiment of this application.

An embodiment of this application provides a picture display method. An example in which the method is performed by a second client is used. The second client is a client controlling a second virtual object. As shown in FIG. 14, the picture display method provided in this embodiment of this application may include operation 1401 to operation 1403.

Operation 1401: Display a virtual environment.

Operation 1402: Display orientation prompt information of a target marked point after a first virtual object marks a target marked point in the virtual environment, the orientation prompt information including a target orientation in which the target marked point is located relative to the second virtual object, and the first virtual object being different from the second virtual object.

Operation 1403: Display, in response to an operation of changing an orientation of the second virtual object to the target orientation, a target virtual environment picture including the target marked point.

For an implementation of operation 1401 to operation 1403, refer to the description of operation 204 to operation 206 in this embodiment shown in FIG. 2. Details are not described herein again.

This embodiment of this application provides a picture display method, and the method is performed by a server. As shown in FIG. 15, the picture display method provided in this embodiment of this application may include operation 1501 to operation 1503.

Operation 1501: Obtain, in response to that a first virtual object marks a target marked point in a virtual environment, a location of the target marked point and a location of the second virtual object, the first virtual object being different from the second virtual object.

Operation 1502: Determine, based on the location of the target marked point and the location of the second virtual object, a target orientation in which the target marked point is located relative to the second virtual object.

Operation 1503: Generate orientation prompt information of the target marked point based on the target orientation; and transmit the orientation prompt information to a client controlling the second virtual object, the client controlling the second virtual object being configured for displaying, based on the orientation prompt information, the target virtual environment picture including the target marked point.

For an implementation of operation 1501 to operation 1503, refer to the description of operation 201 to operation 203 in this embodiment shown in FIG. 2. Details are not described herein again.

An embodiment of this application provides a picture display system, and the system includes a client controlling a second virtual object and a server.

The client controlling the second virtual object is configured for displaying a virtual environment.

The server is configured to obtain, in response to that a first virtual object marks a target marked point in the virtual environment, a location of the target marked point and a location of the second virtual object, the first virtual object being different from the second virtual object; determine, based on the location of the target marked point and the location of the second virtual object, a target orientation in which the target marked point is located relative to the second virtual object; and generate orientation prompt information of the target marked point based on the target orientation, and transmit the orientation prompt information to the client controlling the second virtual object.

The client controlling the second virtual object is further configured to display orientation prompt information of the target marked point after the first virtual object marks the target marked point in the virtual environment, the orientation prompt information including a target orientation; and display, in response to an operation of changing an orientation of the second virtual object to the target orientation, a target virtual environment picture including the target marked point.

Refer to FIG. 16. An embodiment of this application provides a picture display apparatus. The apparatus includes:

a first display unit 1601, configured to display a virtual environment;

a second display unit 1602, configured to display orientation prompt information of a target marked point after a first virtual object marks a target marked point in the virtual environment, the orientation prompt information including a target orientation in which the target marked point is located relative to the second virtual object, and the first virtual object being different from the second virtual object; and a third display unit 1603, configured to display, in response to an operation of changing an orientation of the second virtual object to the target orientation, a target virtual environment picture including the target marked point.

In a possible implementation, the third display unit 1603 is configured to display the orientation prompt information in a first prompt area of a terminal interface in response to that the first virtual object marks the target marked point in the virtual environment; or play back the orientation prompt information by using an audio playback component in response to that the first virtual object marks the target marked point in the virtual environment.

In a possible implementation, the third display unit 1603 is configured to perform picture recognition on a virtual environment picture displayed on the terminal interface to obtain the first prompt area that meets an information display requirement, the information display requirement being configured for constraining virtual environment content displayed in the first prompt area.

In a possible implementation, the third display unit 1603 is configured to perform picture content recognition on the virtual environment picture displayed on the terminal interface to obtain an area in which target display content in the virtual environment picture is displayed; and determine the first prompt area in an area in the terminal interface other than the area in which the target display content is displayed.

In a possible implementation, the terminal interface further includes an orientation coordinate axis, and the orientation coordinate axis is configured for using an orientation of the second virtual object as a center to display a plurality of orientation distribution intervals.

The third display unit 1603 is configured to display a prompt mark at a location corresponding to the target orientation on the orientation coordinate axis, the prompt mark being configured for indicating that the target marked point exists in a direction corresponding to the target orientation on the orientation coordinate axis.

In a possible implementation, the third display unit 1603 is configured to perform picture collection on the virtual environment from a perspective of the second virtual object facing the target orientation; obtain a marked point positioning operation in response to that a collected virtual environment picture does not include the target marked point, the marked point positioning operation being configured for displaying the target marked point when the second virtual object faces the target orientation; and display the target marked point in the virtual environment based on the marked point positioning operation.

In a possible implementation, the terminal interface further includes an orientation coordinate axis, and the orientation coordinate axis is configured for using an orientation of the second virtual object as a center to display a plurality of orientation distribution intervals. The third display unit 1603 is configured to display the target marked point in the virtual environment in response to receiving a trigger operation on the target orientation on the orientation coordinate axis.

In a possible implementation, the apparatus further includes:

an obtaining unit, configured to display an orientation fill-in box; and display the target marked point in the virtual environment in response to receiving a fill-in confirmation operation on the target orientation in the orientation fill-in box.

In a possible implementation, the marked point positioning operation includes at least one of a picture collection range expansion operation or an operation of controlling movement of the second virtual object to the target orientation.

According to the picture display apparatus in embodiments of this application, the orientation prompt information obtained by the client controlling the second virtual object includes the target orientation in which the target marked point is located relative to the second virtual object. Such orientation prompt information can clearly prompt a relationship between the target marked point and the second virtual object in orientation, and the orientation prompt information has high effectiveness. Under prompt of such orientation prompt information, interactive objects can enable the client to display the virtual environment picture including the target marked point by using the operation of changing the orientation of the second virtual object to the target orientation. Operation convenience of displaying the virtual environment picture including the target marked point is high, efficiency of displaying the virtual environment picture including the target marked point is improved, and a human-machine interaction rate and interactive experience of the interactive objects are improved.

Refer to FIG. 17. An embodiment of this application provides a picture display apparatus. The apparatus includes:

an obtaining unit 1701, configured to obtain, in response to that a first virtual object marks a target marked point in a virtual environment, a location of the target marked point and a location of a second virtual object, a first virtual object being different from a second virtual object;

a determining unit 1702, configured to determine, based on the location of the target marked point and the location of the second virtual object, a target orientation in which the target marked point is located relative to the second virtual object;

a transmitting unit 1703, configured to generate orientation prompt information of the target marked point based on the target orientation, and transmit the orientation prompt information to a client controlling the second virtual object, the client being configured for representing the orientation prompt information.

In a possible implementation, the determining unit 1702 is configured to determine a target included angle between a first connecting line and a first ray, the first connecting line being a connecting line between the location of the second virtual object and the location of the target marked point, and the first ray being a ray extending from the location of the second virtual object to a reference orientation; and Use an orientation obtained by deflecting from the reference orientation to the target included angle as the target orientation.

In a possible implementation, the determining unit 1702 is configured to determine coordinate values corresponding to the location of the target marked point in a rectangular coordinate system, the location of the second virtual object being used as an origin of the rectangular coordinate system, and an axis matching the first ray being used as any coordinate axis; and determine the target included angle between the first connecting line and the first ray based on the coordinate values.

In a possible implementation, the determining unit 1702 is configured to determine deviation degrees of a plurality of candidate rays from the first connecting line, the plurality of candidate rays corresponding to a plurality of candidate orientations that the second virtual object faces, any candidate ray being a ray extending from the location of the second virtual object to a candidate orientation corresponding to the any candidate ray, and the first connecting line being a connecting line between the location of the second virtual object and the location of the target marked point; and use a candidate orientation corresponding to a candidate ray with a smallest deviation degree from the first connecting line among the plurality of candidate rays as the target orientation.

According to the picture display apparatus in embodiments of this application, the orientation prompt information transmitted to the client controlling the second virtual object is generated based on the target orientation in which the target marked point is located relative to the second virtual object. Such orientation prompt information can clearly prompt a relationship between the target marked point and the second virtual object in orientation, and the orientation prompt information has high effectiveness. Under prompt of such orientation prompt information, operation convenience of displaying the virtual environment picture including the target marked point is high, efficiency of displaying the virtual environment picture including the target marked point is improved, and a human-machine interaction rate and interactive experience of the interactive objects are improved.

FIG. 18 is a schematic diagram of a structure of a server according to an embodiment of this application. The server may vary a lot due to different configurations or performance, and may include one or more processors (central processing units, CPUs) 1801 and one or more memories 1802. The one or more memories 1802 have at least one computer program stored therein. The at least one computer program is loaded and executed by the one or more processors 1801 to enable the server to implement operation 201 to operation 203 in this embodiment shown in FIG. 2 or implement this embodiment shown in FIG. 15. Certainly, the server may further include components such as a wired or wireless network interface, a keyboard, and an input/output interface, to facilitate input and output. The server may further include another component configured to implement a function of a device. Details are not described herein again.

Figure 19:
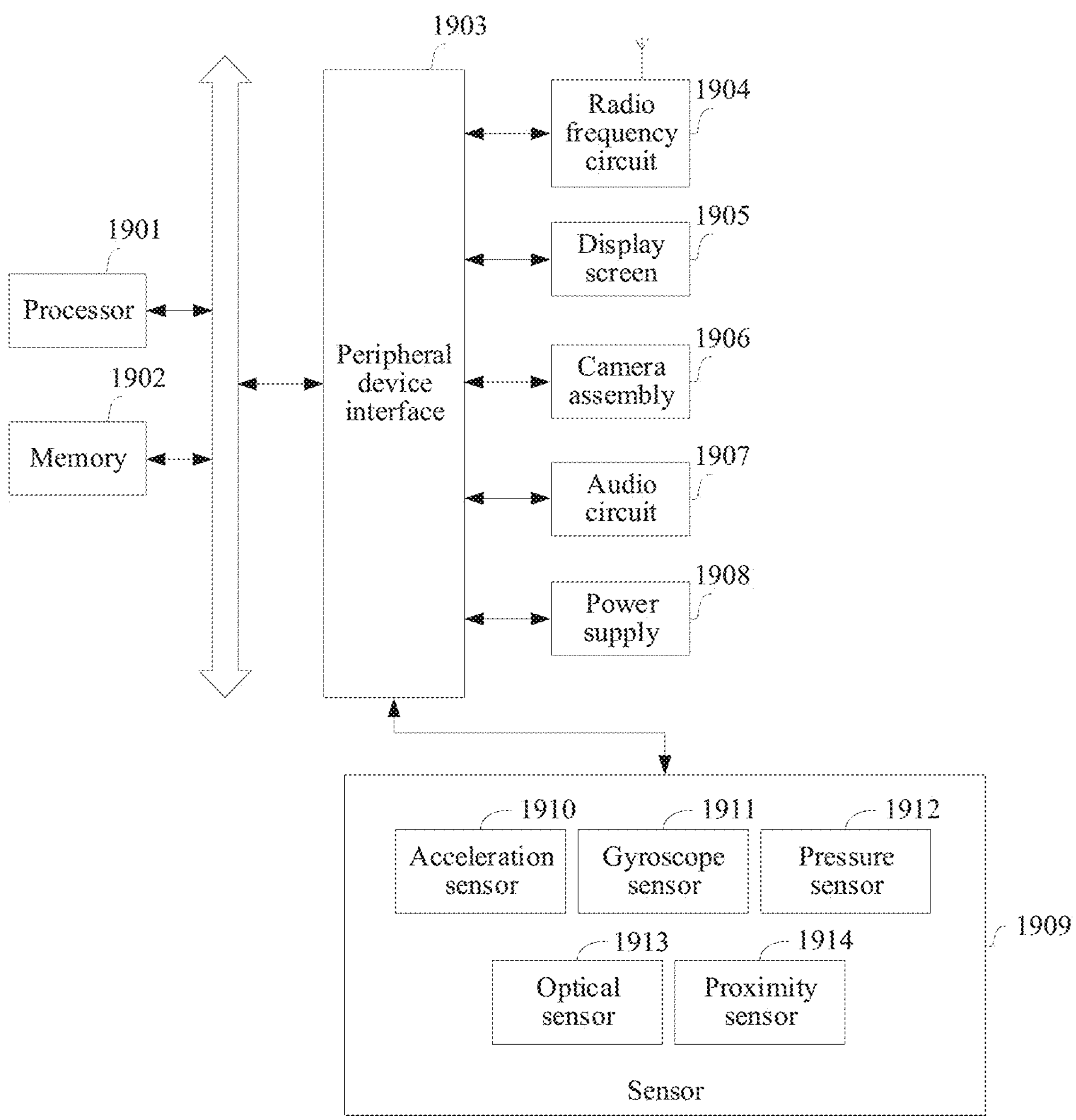
FIG. 19 is a schematic diagram of a structure of a terminal according to an embodiment of this application.

FIG. 19 is a schematic diagram of a structure of a terminal according to an embodiment of this application. The terminal may be a PC, a mobile phone, a smart phone, a PDA, a wearable device, a handheld portable game device, a PPC, a tablet computer, a smart in-vehicle infotainment, a smart television, or a smart speaker. The terminal may also be referred to as another name such as user equipment, a portable terminal, a laptop terminal, or a desktop terminal. For example, the foregoing second client is installed in the terminal. Generally, the terminal includes a processor 1901 and a memory 1902.

The processor 1901 may include one or more processing cores. The processor 1901 may be implemented in at least one hardware form of digital signal processing (DSP), a field-programmable gate array (FPGA), and a programmable logic array (PLA). In some embodiments, the processor 1901 may further include an artificial intelligence (AI) processor. The AI processor is configured to process computing operations related to machine learning. The memory 1902 may include one or more computer-readable storage media. The computer-readable storage medium may be non-transitory. In some embodiments, the non-transitory computer-readable storage medium in the memory 1902 is configured to store at least one instruction. The at least one instruction is configured to be executed by the processor 1901 to enable the second client installed in the terminal to implement operation 204 to operation 206 in this embodiment shown in FIG. 2 or implement this embodiment shown in FIG. 14 in this application. In some embodiments, the terminal may alternatively include a peripheral device interface 1903 and at least one peripheral device. The processor 1901, the memory 1902, and the peripheral device interface 1903 may be connected via a bus or a signal cable. Each peripheral device may be connected to the peripheral device interface 1903 via a bus, a signal cable, or a circuit board. Specifically, the peripheral device includes at least one of a radio frequency circuit 1904, a display screen 1905, a camera assembly 1906, an audio circuit 1907, or a power supply 1908. In some embodiments, the terminal further includes one or more sensors 1909. The one or more sensors 1909 include, but are not limited to an acceleration sensor 1910, a gyroscope sensor 1911, a pressure sensor 1912, an optical sensor 1913, and a proximity sensor 1914.

A person skilled in the art may understand that the structure shown in FIG. 19 does not constitute a limitation to the terminal.

In an exemplary embodiment, a computer device is further provided. The computer device includes a processor and a memory, and the memory has at least one computer program stored therein. The at least one computer program is loaded and executed by one or more processors to enable the computer device to implement any of the foregoing picture display method.

In an exemplary embodiment, a non-transitory computer-readable storage medium is further provided. The computer-readable storage medium has at least one computer program stored thereon, and the at least one computer program is loaded and executed by a processor of a computer device to enable a computer to implement any one of the foregoing picture display methods.

In an exemplary embodiment, a computer program product is further provided. The computer program product includes computer programs or computer instructions. The computer programs or the computer instructions are loaded and executed by a processor to enable a computer to implement any one of the foregoing picture display methods.

In sum, the term "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit can be implemented using one or more processors (or processors and memory). Likewise, a processor (or processors and memory) can be used to implement one or more units. Moreover, each unit can be part of an overall module that includes the functionalities of the unit.

What is claimed is:

1. A method performed by a computer device, the method comprising:

displaying a virtual environment, the virtual environment including a first virtual object associated with a first terminal and a second virtual object associated with a second terminal, wherein the first virtual object and the second virtual object have different orientations in the virtual environment;

in response to that the first virtual object marks a target marked point in the virtual environment, obtaining a location of the target market point and a location of the second virtual object in the virtual environment;

determining orientation prompt information of the target marked point relative to the second virtual object in accordance with the location of the target market point and the location of the second virtual object in the virtual environment; and transmitting the orientation prompt information of the target marked point to the second terminal associated with the second virtual object; and displaying the target marked point in the virtual environment on a terminal interface of the second terminal in response to receiving an operation of changing an orientation of the second virtual object to the target marked point based on the orientation prompt information.

2. The method according to claim 1, wherein:

the orientation prompt information is displayed in a first prompt area of the terminal interface on the second terminal associated with the second virtual object in response to that the first virtual object marks the target marked point in the virtual environment; or the orientation prompt information is played by using an audio playback component at the second terminal in response to that the first virtual object marks the target marked point in the virtual environment.

3. The method according to claim 2, wherein the first prompt area is obtained by performing picture recognition on a virtual environment picture displayed on the terminal interface and identifying an area in which target display content in the virtual environment picture is displayed.

4. The method according to claim 1, wherein the displaying the target marked point in the virtual environment in response to receiving an operation of changing an orientation of the second virtual object to the target marked point based on the orientation prompt information comprises:

performing picture collection on the virtual environment from a perspective of the second virtual object facing the target marked point;

obtaining a marked point positioning operation in response to that a collected virtual environment picture does not comprise the target marked point; and displaying the target marked point in the virtual environment based on the marked point positioning operation.

5. The method according to claim 1, wherein the terminal interface further comprises an orientation coordinate axis, and the orientation coordinate axis is configured for using an orientation of the second virtual object as a center to display a plurality of orientation distribution intervals; and the displaying the target marked point in the virtual environment in response to receiving an operation of changing an orientation of the second virtual object to the target marked point based on the orientation prompt information comprises:

displaying the target marked point in the virtual environment in response to receiving a trigger operation on the orientation coordinate axis in accordance with the orientation prompt information.

6. The method according to claim 1, wherein the displaying the target marked point in the virtual environment in response to receiving an operation of changing an orientation of the second virtual object to the target marked point based on the orientation prompt information comprises:

displaying an orientation fill-in box; and displaying the target marked point in the virtual environment in response to receiving a fill-in confirmation operation in the orientation fill-in box in accordance with the orientation prompt information.

7. The method according to claim 6, wherein the marked point positioning operation comprises at least one of a picture collection range expansion operation or an operation of controlling movement of the second virtual object to the target orientation.

8. A computer device, comprising a processor and a memory, the memory having at least one computer program stored therein, and the at least one computer program being loaded and executed by the processor to enable the computer device to implement a method including:

displaying a virtual environment, the virtual environment including a first virtual object associated with a first terminal and a second virtual object associated with a second terminal, wherein the first virtual object and the second virtual object have different orientations in the virtual environment;

in response to that the first virtual object marks a target marked point in the virtual environment, obtaining a location of the target market point and a location of the second virtual object in the virtual environment;

determining orientation prompt information of the target marked point relative to the second virtual object in accordance with the location of the target market point and the location of the second virtual object in the virtual environment; and transmitting the orientation prompt information of the target marked point to the second terminal associated with the second virtual object; and displaying the target marked point in the virtual environment on a terminal interface of the second terminal in response to receiving an operation of changing an orientation of the second virtual object to the target marked point based on the orientation prompt information.

9. The computer device according to claim 8, wherein:

the orientation prompt information is displayed in a first prompt area of the terminal interface on the second terminal associated with the second virtual object in response to that the first virtual object marks the target marked point in the virtual environment; or the orientation prompt information is played by using an audio playback component at the second terminal in response to that the first virtual object marks the target marked point in the virtual environment.

10. The computer device according to claim 9, wherein the first prompt area is obtained by performing picture recognition on a virtual environment picture displayed on the terminal interface and identifying an area in which target display content in the virtual environment picture is displayed.

11. The computer device according to claim 8, wherein the displaying the target marked point in the virtual environment in response to receiving an operation of changing an orientation of the second virtual object to the target marked point based on the orientation prompt information comprises:

performing picture collection on the virtual environment from a perspective of the second virtual object facing the target marked point;

obtaining a marked point positioning operation in response to that a collected virtual environment picture does not comprise the target marked point; and displaying the target marked point in the virtual environment based on the marked point positioning operation.

12. The computer device according to claim 8, wherein the terminal interface further comprises an orientation coordinate axis, and the orientation coordinate axis is configured for using an orientation of the second virtual object as a center to display a plurality of orientation distribution intervals; and the displaying the target marked point in the virtual environment in response to receiving an operation of changing an orientation of the second virtual object to the target marked point based on the orientation prompt information comprises:

displaying the target marked point in the virtual environment in response to receiving a trigger operation on the orientation coordinate axis in accordance with the orientation prompt information.

13. The computer device according to claim 8, wherein the displaying the target marked point in the virtual environment in response to receiving an operation of changing an orientation of the second virtual object to the target marked point based on the orientation prompt information comprises:

displaying an orientation fill-in box; and displaying the target marked point in the virtual environment in response to receiving a fill-in confirmation operation in the orientation fill-in box in accordance with the orientation prompt information.

14. The computer device according to claim 13, wherein the marked point positioning operation comprises at least one of a picture collection range expansion operation or an operation of controlling movement of the second virtual object to the target orientation.

15. A non-transitory computer-readable storage medium, having at least one computer program stored thereon, and the at least one computer program being loaded and executed by a processor of a computer device to enable the computer device to implement a method including:

displaying a virtual environment, the virtual environment including a first virtual object associated with a first terminal and a second virtual object associated with a second terminal, wherein the first virtual object and the second virtual object have different orientations in the virtual environment;

in response to that the first virtual object marks a target marked point in the virtual environment, obtaining a location of the target market point and a location of the second virtual object in the virtual environment;

determining orientation prompt information of the target marked point relative to the second virtual object in accordance with the location of the target market point and the location of the second virtual object in the virtual environment; and transmitting the orientation prompt information of the target marked point to the second terminal associated with the second virtual object; and displaying the target marked point in the virtual environment on a terminal interface of the second terminal in response to receiving an operation of changing an orientation of the second virtual object to the target marked point based on the orientation prompt information.

16. The non-transitory computer-readable storage medium according to claim 15, wherein:

the orientation prompt information is displayed in a first prompt area of the terminal interface on the second terminal associated with the second virtual object in response to that the first virtual object marks the target marked point in the virtual environment; or the orientation prompt information is played by using an audio playback component at the second terminal in response to that the first virtual object marks the target marked point in the virtual environment.

17. The non-transitory computer-readable storage medium according to claim 16, wherein the first prompt area is obtained by performing picture recognition on a virtual environment picture displayed on the terminal interface and identifying an area in which target display content in the virtual environment picture is displayed.

18. The non-transitory computer-readable storage medium according to claim 15, wherein the displaying the target marked point in the virtual environment in response to receiving an operation of changing an orientation of the second virtual object to the target marked point based on the orientation prompt information comprises:

performing picture collection on the virtual environment from a perspective of the second virtual object facing the target marked point;

obtaining a marked point positioning operation in response to that a collected virtual environment picture does not comprise the target marked point; and displaying the target marked point in the virtual environment based on the marked point positioning operation.

19. The non-transitory computer-readable storage medium according to claim 15, wherein the terminal interface further comprises an orientation coordinate axis, and the orientation coordinate axis is configured for using an orientation of the second virtual object as a center to display a plurality of orientation distribution intervals; and the displaying the target marked point in the virtual environment in response to receiving an operation of changing an orientation of the second virtual object to the target marked point based on the orientation prompt information comprises:

displaying the target marked point in the virtual environment in response to receiving a trigger operation on the orientation coordinate axis in accordance with the orientation prompt information.

20. The non-transitory computer-readable storage medium according to claim 15, wherein the displaying the target marked point in the virtual environment in response to receiving an operation of changing an orientation of the second virtual object to the target marked point based on the orientation prompt information comprises:

displaying an orientation fill-in box; and displaying the target marked point in the virtual environment in response to receiving a fill-in confirmation operation in the orientation fill-in box in accordance with the orientation prompt information.

* * * * *